United States Patent
Sundararaman et al.

(10) Patent No.: US 8,848,723 B2
(45) Date of Patent: Sep. 30, 2014

(54) SCHEDULING HIERARCHY IN A TRAFFIC MANAGER OF A NETWORK PROCESSOR

(75) Inventors: Balakrishnan Sundararaman, Cedar Park, TX (US); Shashank Nemawarkar, Austin, TX (US); David Sonnier, Austin, TX (US); Shailendra Aulakh, Austin, TX (US)

(73) Assignee: LSI Corporation, San Jose, CA (US)

( * ) Notice: Subject to any disclaimer, the term of this patent is extended or adjusted under 35 U.S.C. 154(b) by 440 days.

(21) Appl. No.: 13/250,910

(22) Filed: Sep. 30, 2011

(65) Prior Publication Data
US 2012/0020369 A1 Jan. 26, 2012

Related U.S. Application Data

(63) Continuation-in-part of application No. 12/782,379, filed on May 18, 2010, and a continuation-in-part of application No. 12/782,411, filed on May 18, 2010, now Pat. No. 8,407,707, and a continuation-in-part of application No. 12/782,393, filed on May 18, 2010, now Pat. No. 8,255,644.

(60) Provisional application No. 61/388,962, filed on Oct. 1, 2010.

(51) Int. Cl.
| | |
|---|---|
| H04L 12/28 | (2006.01) |
| H04L 12/937 | (2013.01) |
| H04L 12/863 | (2013.01) |
| H04L 12/931 | (2013.01) |
| H04L 12/933 | (2013.01) |
| H04L 12/861 | (2013.01) |
| G06F 12/08 | (2006.01) |

(52) U.S. Cl.
CPC .............. *H04L 49/254* (2013.01); *H04L 49/90* (2013.01); *G06F 12/0813* (2013.01); *H04L 47/621* (2013.01); *H04L 47/623* (2013.01); *H04L 49/00* (2013.01); *H04L 49/101* (2013.01); *H04L 49/109* (2013.01); *H04L 49/506* (2013.01)

USPC .......................................................... 370/412

(58) Field of Classification Search
CPC ........................................................ H04L 49/90
USPC .......................................................... 370/412
See application file for complete search history.

(56) References Cited

U.S. PATENT DOCUMENTS

| | | |
|---|---|---|
| 4,622,631 A | 11/1986 | Frank et al. |
| 5,623,698 A | 4/1997 | Stephenson et al. |

(Continued)

FOREIGN PATENT DOCUMENTS

JP      H02-271444      11/1990

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

(Continued)

*Primary Examiner* — Mark Rinehart
*Assistant Examiner* — Christopher R Crompton

(57) ABSTRACT

Described embodiments provide for dynamically constructing a scheduling hierarchy of a network processor. A traffic manager generates a tree scheduling hierarchy having a root scheduler and N scheduler levels. The network processor generates tasks corresponding to received packets. The traffic manager queues the received task in the associated queue, the queue having a corresponding parent scheduler at each of one or more next levels of the scheduling hierarchy up to the root scheduler. A parent scheduler selects, starting at the root scheduler and iteratively repeating at each of the corresponding N scheduling levels until a queue is selected, a child node to transmit at least one task. The traffic manager forms output packets for transmission based on the at least one task from the selected queue.

16 Claims, 21 Drawing Sheets

(56) References Cited

U.S. PATENT DOCUMENTS

| | | | |
|---|---|---|---|
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,216,167 B1 | 4/2001 | Momirov | |
| 6,289,013 B1 | 9/2001 | Lakshman et al. | |
| 6,341,130 B1 | 1/2002 | Lakshman et al. | |
| 6,567,564 B1 | 5/2003 | van der Wal | |
| 6,636,932 B1 | 10/2003 | Regev et al. | |
| 6,914,882 B2 | 7/2005 | Merani et al. | |
| 7,035,212 B1* | 4/2006 | Mittal et al. | 370/230 |
| 7,058,057 B2 | 6/2006 | Dooley et al. | |
| 7,089,346 B2 | 8/2006 | Cebulla et al. | |
| 7,159,219 B2 | 1/2007 | Chen et al. | |
| 7,180,887 B1* | 2/2007 | Schwaderer et al. | 370/351 |
| 7,234,018 B1 | 6/2007 | Purcell et al. | |
| 7,397,809 B2 | 7/2008 | Wang | |
| 7,453,898 B1 | 11/2008 | Cohen et al. | |
| 7,461,208 B1 | 12/2008 | Caprioli et al. | |
| 7,519,065 B2 | 4/2009 | Angle et al. | |
| 7,561,078 B2* | 7/2009 | Hwang et al. | 341/79 |
| 7,596,142 B1 | 9/2009 | MacAdam | |
| 7,600,078 B1 | 10/2009 | Cen et al. | |
| 7,659,894 B2 | 2/2010 | Keller et al. | |
| 7,720,055 B2 | 5/2010 | Kadambi et al. | |
| 7,876,763 B2* | 1/2011 | Cohen et al. | 370/395.42 |
| 2002/0029214 A1 | 3/2002 | Yianilos et al. | |
| 2002/0165985 A1 | 11/2002 | Chen et al. | |
| 2003/0033276 A1 | 2/2003 | Cheng et al. | |
| 2003/0115417 A1 | 6/2003 | Corrigan | |
| 2003/0123468 A1 | 7/2003 | Nong | |
| 2004/0255209 A1 | 12/2004 | Gross | |
| 2004/0260829 A1* | 12/2004 | Husak et al. | 709/232 |
| 2005/0027920 A1 | 2/2005 | Fitzsimmons et al. | |
| 2005/0152352 A1 | 7/2005 | Jun et al. | |
| 2006/0029079 A1 | 2/2006 | Cohen et al. | |
| 2006/0153184 A1* | 7/2006 | Kounavis et al. | 370/389 |
| 2006/0256783 A1 | 11/2006 | Ayrapetian et al. | |
| 2007/0016756 A1 | 1/2007 | Hsieh et al. | |
| 2007/0226798 A1 | 9/2007 | Sibert | |
| 2008/0162793 A1 | 7/2008 | Chu et al. | |
| 2008/0239992 A1 | 10/2008 | Krasnyanskiy | |
| 2009/0319775 A1* | 12/2009 | Buer et al. | 713/153 |
| 2010/0171524 A1* | 7/2010 | Lee et al. | 326/41 |
| 2010/0260198 A1 | 10/2010 | Rojas-Cessa et al. | |
| 2013/0081055 A1* | 3/2013 | Maruyama | 718/108 |

OTHER PUBLICATIONS

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

* cited by examiner

618

1000

1100

1200

1800

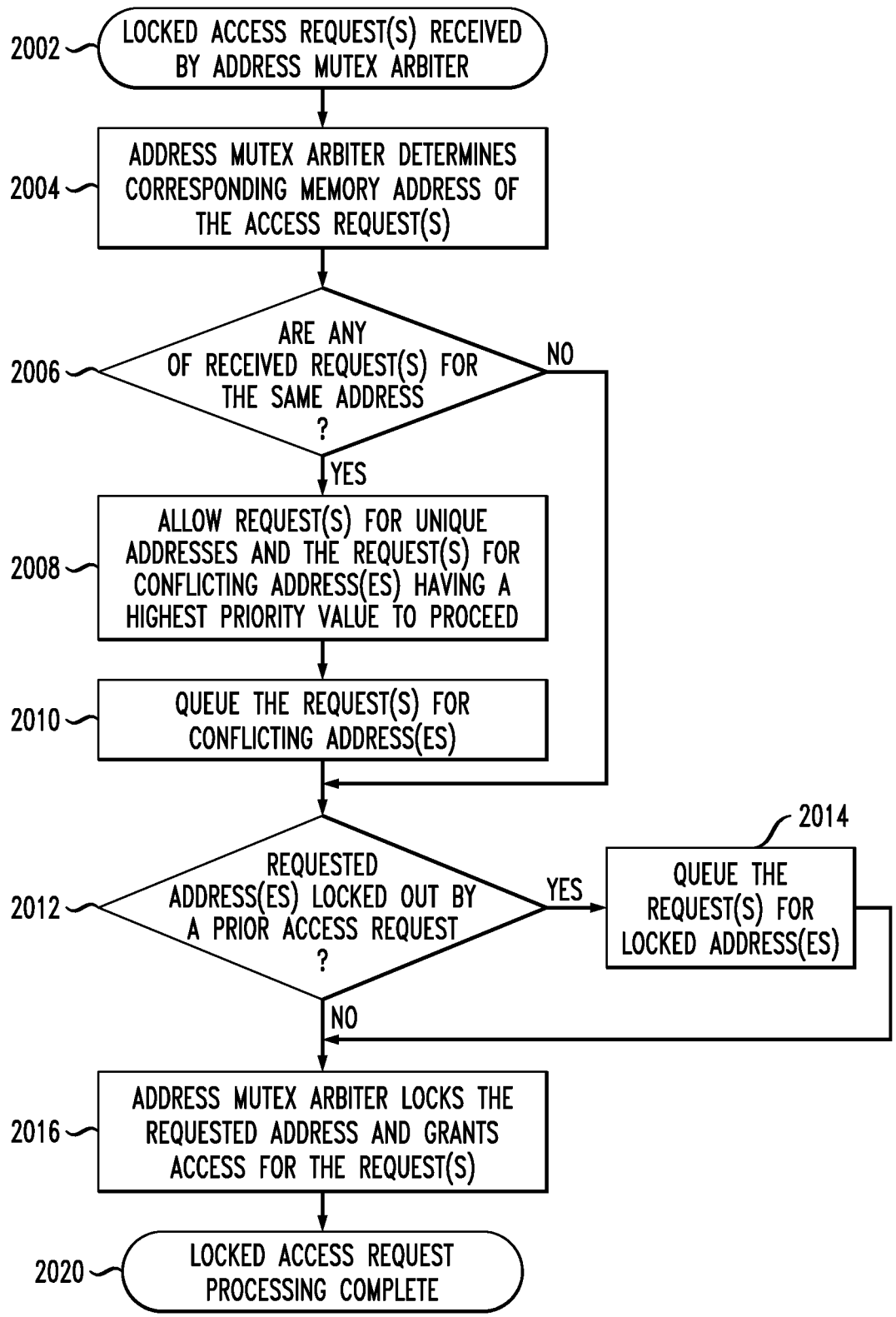

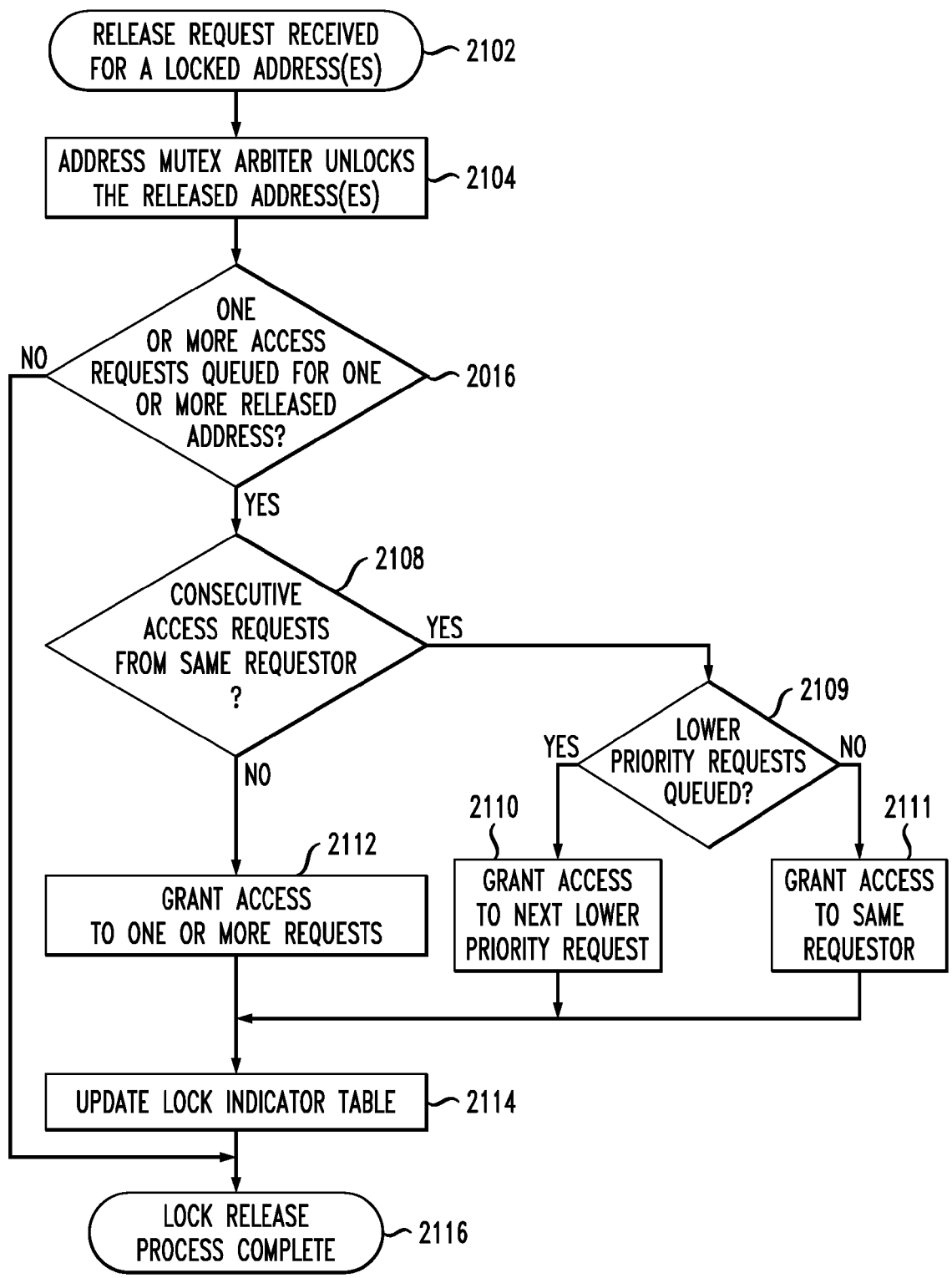

SCHEDULING HIERARCHY IN A TRAFFIC MANAGER OF A NETWORK PROCESSOR

CROSS-REFERENCE TO RELATED APPLICATIONS

This application claims the benefit of the filing date of U.S. provisional application No. 61/388,962, filed Oct. 1, 2010, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now U.S. Pat. No. 8,255,644 and 12/782,411 filed May 18, 2010, now U.S. Pat. No. 8,407,707, the teachings of which are incorporated herein in their entireties by reference.

The subject matter of this application is related to U.S. patent application Ser No. 12/430,438 filed Apr. 27, 2009, now U.S. Pat. No. 8,352,669, Ser. No. 12/729,226 filed Mar. 22, 2010, now U.S. Pat. No. 8,243,737, Ser. No. 12/729,231 filed Mar. 22, 2010, now U.S. Pat. No. 8,473,657, Ser. No. 12/963,895 filed Dec. 9, 2010, now U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now U.S. Pat. No. 8,505,013, Ser. No. 12/975,880 filed Dec. 22, 2010, now U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, now U.S. Pat. No. 8,489,792, Ser. No. 12/979,800 filed Dec. 28, 2010, now U.S. Pat. No. 8,489,794, Ser. No. 13/046,717 filed Mar. 12, 2011, now U.S. Pat. No. 8,539,199, Ser. No. 13/046,719 filed Mar. 12, 2011, now U.S. Pat. No. 8,321,385, Ser. No. 13/046,726 filed Mar. 12, 2011, now U.S. Pat. No. 8,537,832, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/251,091, now U.S. Pat. No. 8,565,250 filed on common date herewith, Ser. No. 13/250,927, now U.S. Pat. No. 8,619,787, filed on common date herewith, Ser. No. 13/250,932, now U.S. Pat. No. 8,576,862 filed on common date herewith, Ser. No. 13/250,898 filed on common date herewith, Ser. No. 13/250,948 filed on common date herewith, Ser. No. 13/250,865 filed on common date herewith, Ser. No. 13/250,837, now U.S. Pat. No. 8,638,805 filed on common date herewith, Ser. No. 13/251,035, now U.S. Pat. No. 8,547,878 filed on common date herewith, Ser. No. 13/250,883, now U.S. Pat. No. 8,615,013 filed on common date herewith, Ser. No. 13/250,891 filed on common date herewith, Ser. No. 13/250,938 filed on common date herewith, and Ser. No. 13/250,954 filed on common date herewith, the teachings of which are incorporated herein in their entireties by reference.

BACKGROUND OF THE INVENTION

1. Field of the Invention

The present invention relates to communication systems, in particular, to data caching and coherency maintenance for an accelerated processor architecture for packet networks.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators. Network processors implemented as a system on chip (SoC) having multiple processing modules might typically classify an incoming packet to determine which of the processing modules will perform operations for the particular packet or flow of packets.

A network processor in a switching network might provide transport of received data packets from an input port to one (unicast) or more (multicast) output ports of the network. Received data packets are provided to one or more output ports according to a scheduling algorithm. Traditionally, a network processor includes a traffic manager to schedule packets for transmission by the network processor based on a scheduling hierarchy. A scheduling hierarchy might be a tree structure of queues and schedulers. Each scheduler performs arbitration to pick an eligible child node for transmission in each scheduling cycle such that a packet is typically scheduled for transmission in each scheduling cycle of the network processor.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for dynamically constructing a scheduling hierarchy of a network processor. A traffic manager generates a tree scheduling hierarchy having a root scheduler and N scheduler levels. The network processor generates tasks corresponding to received packets. The traffic manager queues the received task in the associated queue, the queue having a corresponding parent scheduler at each of one or more next levels of the scheduling hierarchy up to the root scheduler. A parent scheduler selects, starting at the root scheduler and iteratively repeating at each of the corresponding N scheduling levels until a queue is selected, a child node to transmit at least one task. The traffic manager forms output packets for transmission based on the at least one task from the selected queue.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 20 shows a flow diagram of a memory access request process of the traffic manager of FIG. 3, in accordance with embodiments of the present invention; and FIG. 21 shows a flow diagram of a memory lock release process of the traffic manager of FIG. 3, in accordance with embodiments of the present invention.

DETAILED DESCRIPTION

Described embodiments of the present invention provide a Modular Traffic Manager (MTM) for a multi-core, multi-threaded network processor.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SRIO | Serial RapidIO | CPU | Central Processing Unit |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| TS | Traffic Shaper | FSM | Finite State Machine |
| PCR | Peak Cell Rate | MCR | Minimum Cell Rate |
| EF | Expedited Forwarding | AF | Assured Forwarding |
| BE | Best Effort Forwarding | SDWRR | Smooth Deficit Weighted Round Robin |
| mutex | MUtually EXclusive | CRC | Cyclic Redundancy Check |
| IP | Internet Protocol | | |

Figure 1:
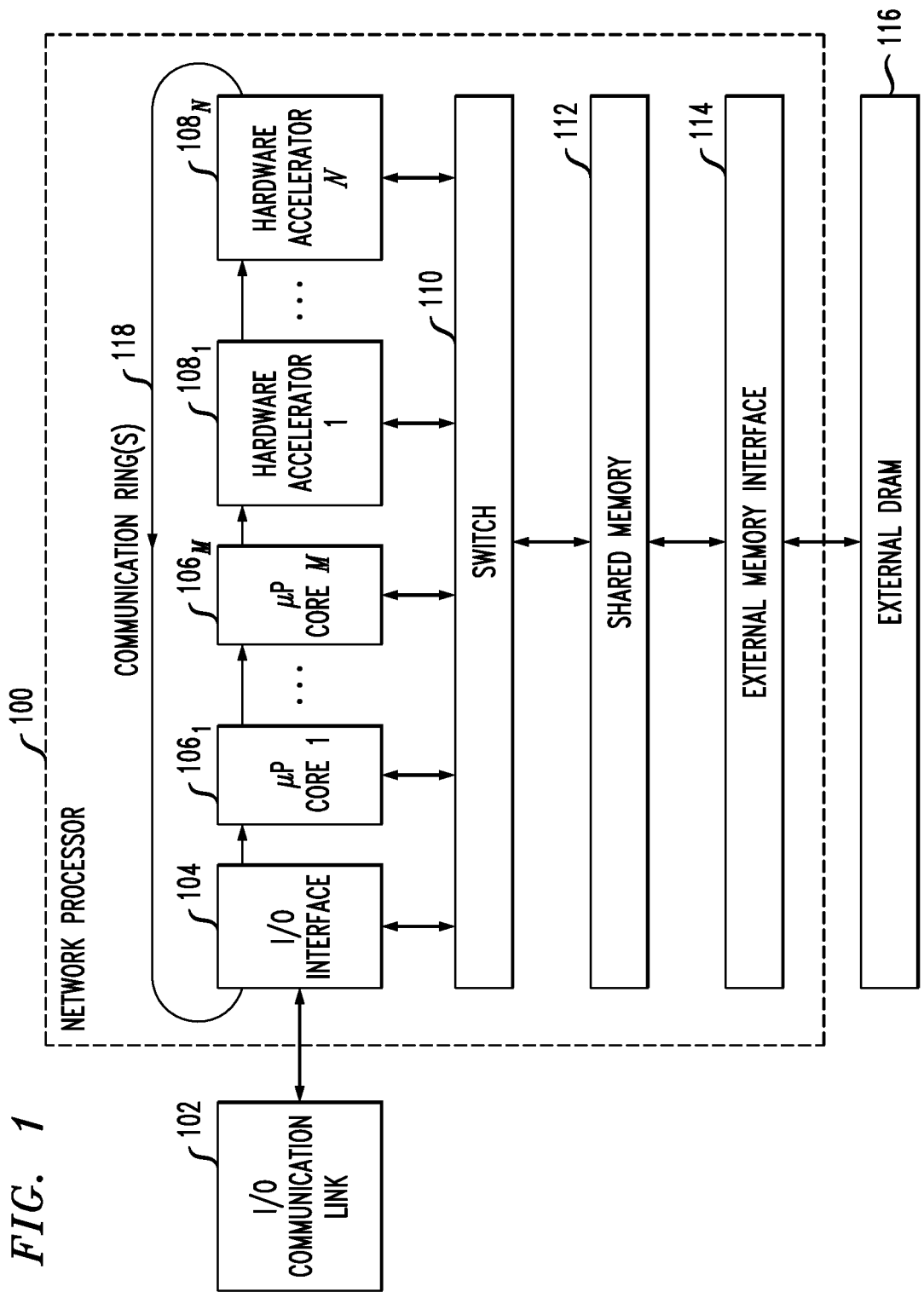
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M is an integer greater than or equal to 0, and N is a positive integer. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not needed by the various μP cores 106 and hardware accelerators 108 to free space in shared memory 112. The μP cores and hardware accelerators might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411, all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted externally of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. Nos. 7,439,652 and 7,899,904, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache trashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hashtable additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

As will be described herein, the MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighted round robin (SD-WRR) for every queue and scheduler. The MTM might also support multicasting. Each copy of a packet is scheduled independently and traverses down different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

Figure 2:
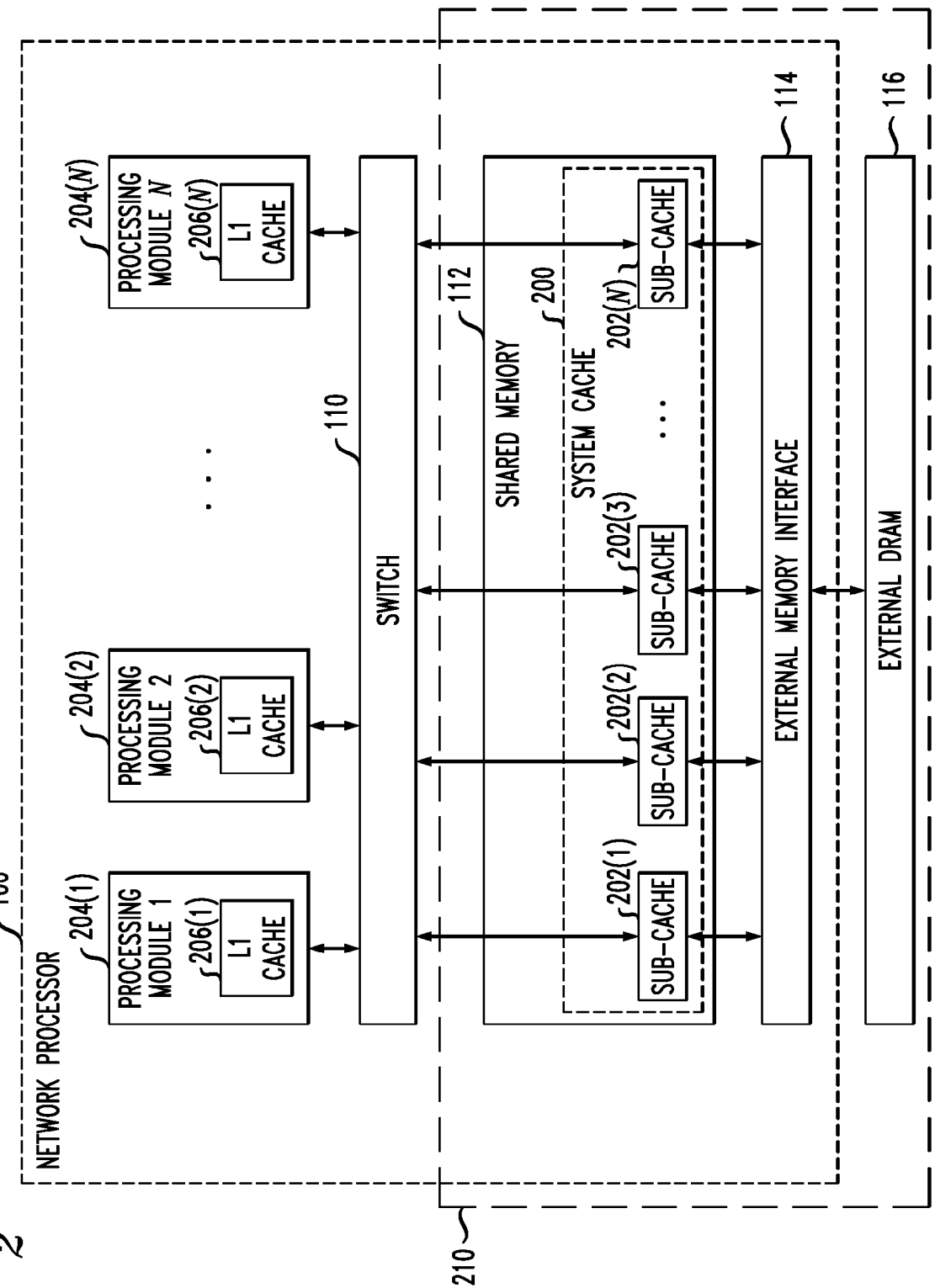
FIG. 2 shows a block diagram of a system cache of the network processor of FIG. 1.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more sub-caches, shown as sub-caches 202(1)-202(N). Sub-caches 202(1)-202(N) might be employed to cache data from any µP core or accelerator (e.g., µP cores 106 or accelerators 108) of network processor 100. As indicated by dashed line 210, shared memory 112 and external memory 116 might generally be referred to as system memory 212.

As described in related U.S. patent application Ser. Nos. 12/782,379, 12/782,393, and 12/782,411, which are incorporated by reference herein, sub-caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 202(1)-202(N) might form a memory array, and the number of system caches might preferably be implemented as a power of two. One or more memory blocks might be allocated to each sub-cache 202(1)-202(N). In embodiments of the present invention, each sub-cache 202(1)-202(N) might be implemented as an N-way associative cache employing a least recently used (LRU) caching algorithm. In some embodiments, each sub-cache 202(1)-202(N) might have a total size of 512 kB and a cache line length of 256 B.

As shown in FIG. 2, one or more of processing modules 204(1)-204(N) might have a corresponding local level one (L1) cache, shown as L1 caches 206(1)-206(N). The function of L1 caches 206(1)-206(N) is to act as an interface to system cache 200 for client processing modules 204(1)-204(N) of network processor 100. L1 caches 206(1)-206(N) might be referred to as "pipeline" caches, since L1 caches 206(1)-206(N) might typically be employed only for certain ones of client processing modules 204(1)-204(N) that access system cache 200 as part of an execution pipeline.

Figure 3:
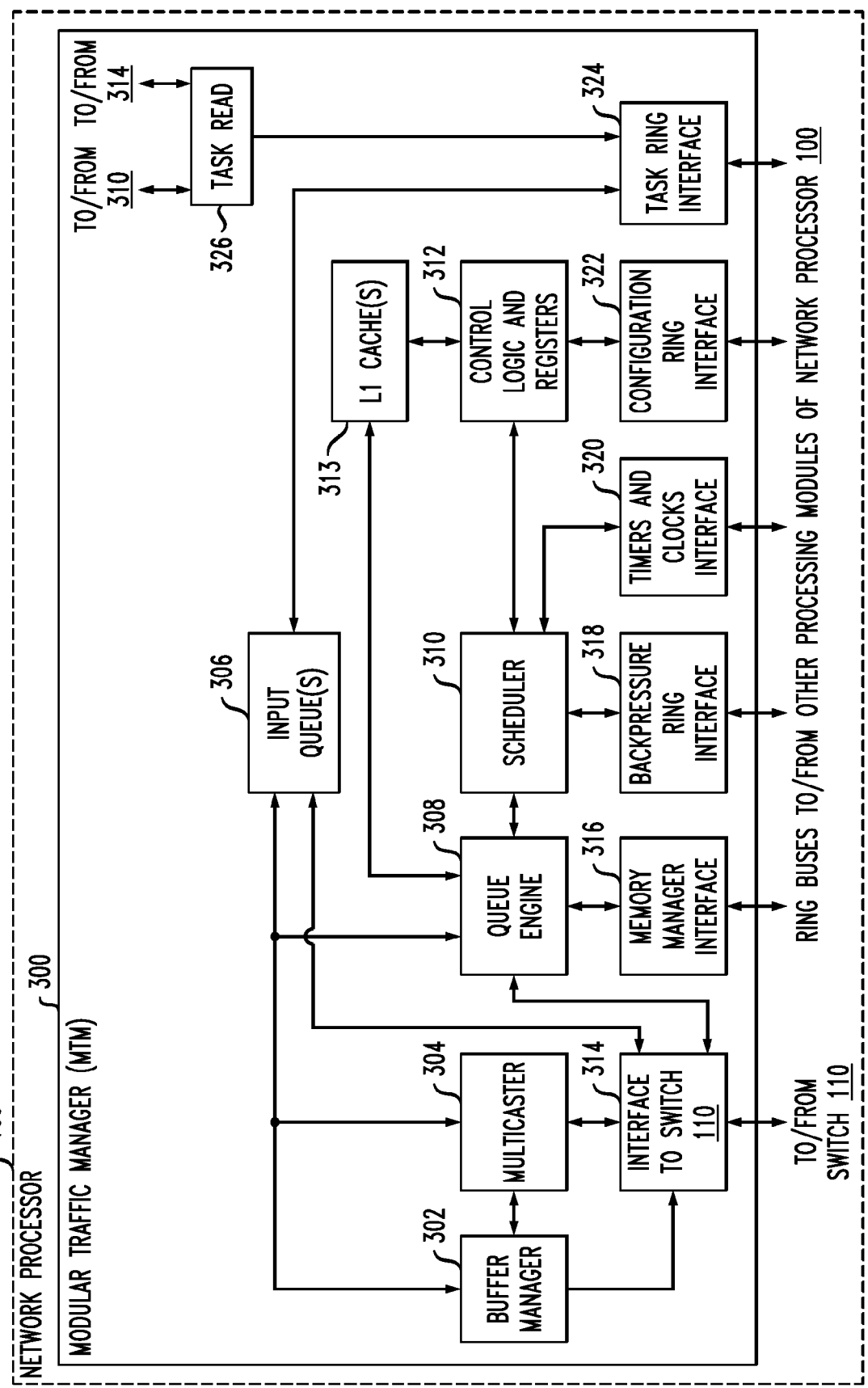
FIG. 3 shows a block diagram of a traffic manager of the network processor of FIG. 1, in accordance with embodiments of the present invention.

FIG. 3 shows a block diagram of an exemplary embodiment of MTM 300 of network processor 100, in accordance with embodiments of the present invention. In described embodiments, MTM 300 might typically serve as a processing node of one or more of the virtual pipelines for task processing in network processor 100. As described herein, a virtual pipeline defines a processing order of a task through one or more of the processing modules of network processor 100. Typically, MTM 300 might, for example, serve as a mid-point processing module in a virtual pipeline for unicast packets (e.g., a packet being sent to a single network node). MTM 300 might also typically serve as a beginning processing node of a virtual pipeline for multicast packets (e.g., a packet being sent to multiple network nodes).

As shown in FIG. 3, MTM 300 accesses system memory 210 via an interface to switch 100, shown as interface 314, and MTM 300 might interface to one or more clock networks and timer signals of network processor 100 via timers and clocks interface 320. MTM 300 includes one or more interfaces to various ring communication buses of network processor 100, for example, memory manager interface 316 might interface to the MMB of network processor 100 via a memory manager ring bus, backpressure ring interface 318 that might interface to one or more processing modules 204 via a backpressure ring bus, configuration ring interface 322 that might interface to a configuration manager of network processor 100, and task ring interface 324 which might transfer tasks between one or more processing modules 204 of network processor 100. In general, the one or more ring buses might function substantially as described in related U.S. patent application Ser. No. 12/782,379 filed May 18, 2010, for example by passing a task from source processing module to a destination processing module. The configuration manager of network processor 100 might function substantially as described in related U.S. patent application Ser. No. 13/192, 140, filed Jul. 27, 2011, for example by configuring processing modules of network processor 100 by interfacing with the configuration ring buses, the system memory, a debugging interface or internal or external control processors, and ensuring memory coherency between different memories and caches within network processor 100.

As described herein, network processor 100 might generally send and receive data packets, for example, an IP packet, and each packet might have one or more corresponding tasks sent between processing modules of network processor 100 for processing of the packet data. As described herein, MTM 300 schedules data packets corresponding to the tasks for transmission from network processor 100 according to one or more rules (e.g., priorities, traffic shaping rules, etc.). As shown in FIG. 3, MTM 300 includes buffer manager 302, multicaster 304, one or more input queues 306, queue engine 308, scheduler 310, control logic and registers 312 and one or more L1 caches 313. As will be described, tasks received by MTM 300 are placed in one of a plurality of queues, shown as input queues 306, until the tasks can be scheduled by scheduler 310 for transmission by network processor 100. Typical task source processing modules for M™ 300 include: i) the MPP; ii) the PAB; iii) an error checking module of network processor 100, for example a processing module that implements a checksum or other error correction for packets to be transmitted by network processor 100; and iv) one or more control processors of network processor 100 (e.g., one of µP cores 106), for example when a control packet is inserted in the output stream of network processor 100. Typical destination processing modules for tasks sent by MTM include: i) Stream Editor (SED) since packet data might require editing prior to transmission by network processor 100; ii) the error checking module of network processor 100, for example if checksum or other error correction data needs to be recalculated for packets to be transmitted by network processor 100; and iii) one or more control processors of network processor 100 (e.g., one of µP cores 106), for example when a packet requires additional processing before transmission by network processor 100.

In some embodiments, input queue block 306 might include four input task queues (not shown). Two of the input task queues might be employed to queue low and high priority unicast packets, and the second pair of task queues might be employed to queue low and high priority multicast packets. This separation of unicast and multicast input queues is beneficial since multicast tasks typically take longer to enqueue than unicast tasks, since multiple copies of tasks are placed in corresponding queues for multicast tasks. MTM 300 queues tasks of the same type in the same task queue in order. MTM 300, via scheduler 310, might implement a programmable weighted round-robin service policy between the various task queues of input queue block 306. High priority task queues might generally be scheduled before low priority task queues. In some embodiments, the various queues in block 306 might be implemented as FIFO queues pointing to task data stored in system memory 210. Each FIFO might be implemented as one or more 2 KB blocks that can be dynamically linked to additional memory blocks, for example such as described in related U.S. patent application Ser. No. 13/046,717, filed Mar. 12, 2011. Further, scheduler 310 might typically support up to an N-level scheduling hierarchy. In general, L1 cache 313 might include up to N separate L1 cache modules, one for each hierarchy level of scheduler 310, where each L1 cache module operates substantially as described in related U.S. patent application Ser. No. 13/192,140, filed Jul. 27, 2011. In an exemplary embodiment, N might be 7. Task read module 326 might read data corresponding to tasks from system memory 210 and interface with task ring interface 324, interface 314 and scheduler 310.

Figure 4:
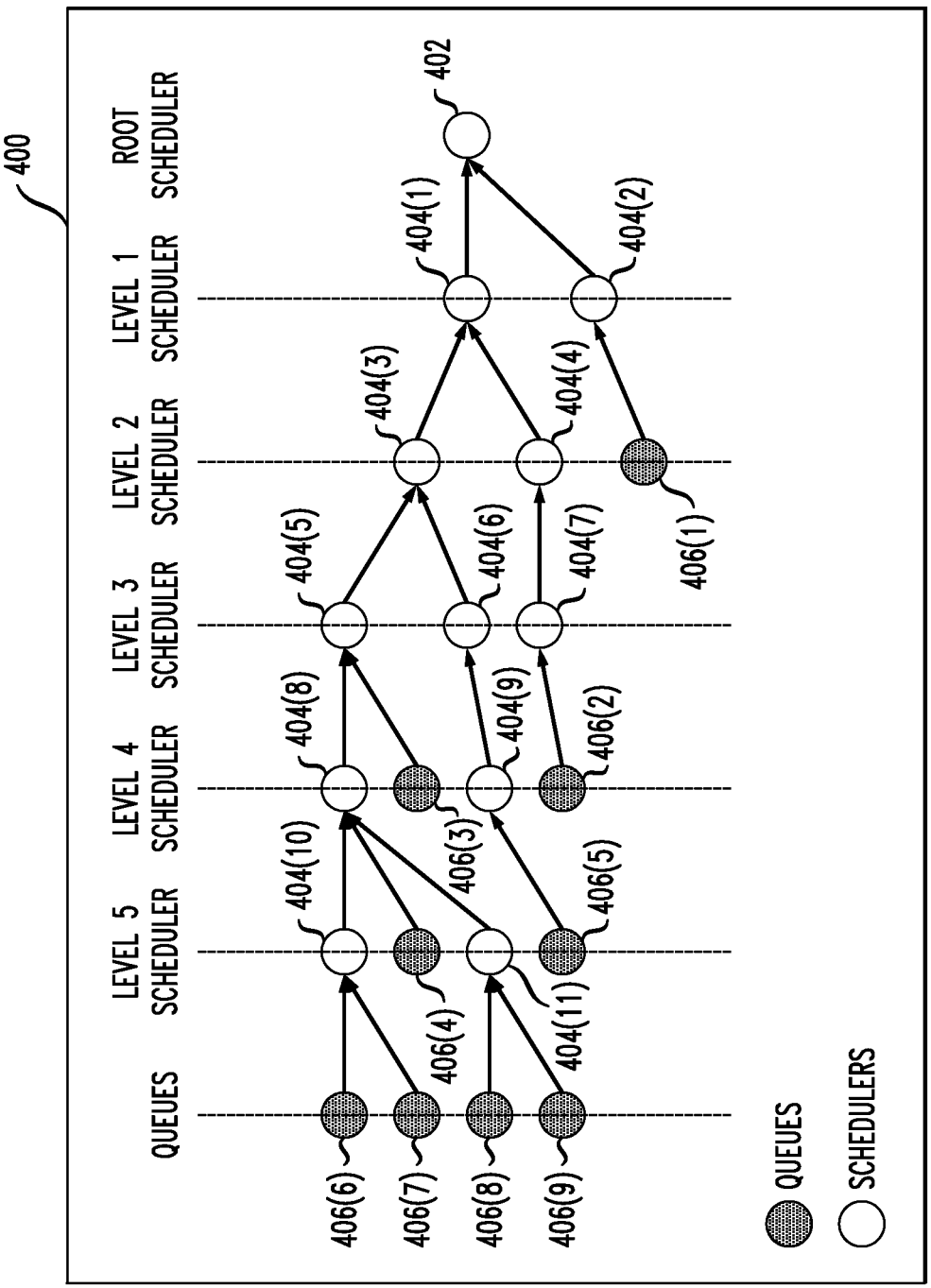
FIG. 4 shows an exemplary scheduler and queue hierarchy of the traffic manager of FIG. 3, in accordance with embodiments of the present invention.

FIG. 4 shows an exemplary scheduler and queue hierarchy 400 of MTM 300. As shown in FIG. 4, scheduling hierarchy 400 includes one or more queues 406 and one or more schedulers 404, as well as a root scheduler 402. Root scheduler 402 is the first level of scheduling hierarchy 400 and can schedule either queues 406 or other schedulers 404 since, as shown in FIG. 4, each level of scheduling hierarchy 400 other than the root level can contain either queues 406 or other schedulers 404. Each scheduler 404 might schedule tasks from a plurality of queues 406 in its level. A queue is a leaf node of scheduling hierarchy 400, and might typically be a FIFO of tasks corresponding to a packet of network processor 100. A given scheduler 404 might also schedule tasks from one or more other schedulers in its level. If there are other schedulers under a given scheduler, there is another level of hierarchy in scheduling tasks. Some embodiments of scheduling hierarchy 400 might include up to seven levels of scheduling hierarchy and allow a maximum of 32 child nodes under root scheduler 402.

Queues might typically exist at any level of scheduling hierarchy 400 other than the root level, which might only contain schedulers to subsequent levels of hierarchy 400. In described embodiments of scheduling hierarchy 400, any node in the hierarchy might have up to 64 k child nodes. Root scheduler 402 and each scheduler 406 in scheduling hierarchy 400 arbitrates between the children of this particular scheduler to pick a task to be scheduled for transmission by MTM 300. Further, root scheduler 402 and each scheduler 406 perform traffic shaping for the particular scheduling node to shape the traffic to a particular rate. In some embodiments, each scheduler 406 and root scheduler 402 might selectably perform Smooth Deficit Weighted Round Robin (SDWRR), Deficit Weighted Round Robin (DWRR) or Strict Priority arbitration between queues 404 and schedulers 406 under it.

Figure 5:
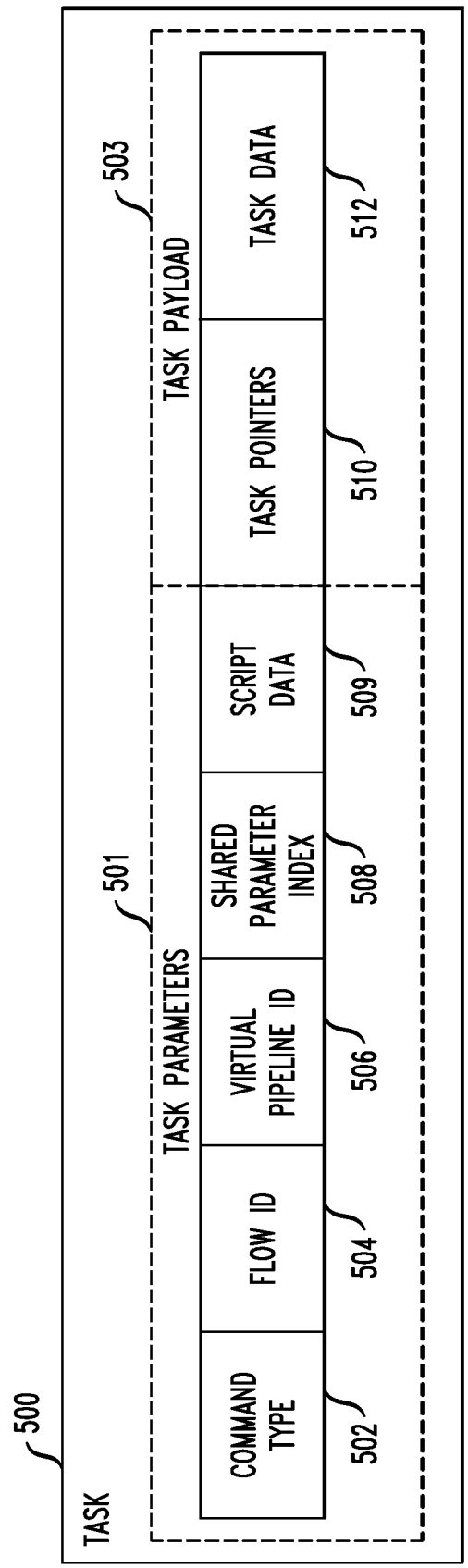
FIG. 5 shows an exemplary block diagram of a task provided to the traffic manager of FIG. 3, in accordance with embodiments of the present invention.

FIG. 5 shows an exemplary task, 500, that might be provided to MTM 300. As shown in FIG. 5, task 500 might typically include one or more task parameters 501 and task payload 503. As shown, task parameters 501 might include a command type field 502, a Flow ID field 504, a virtual pipeline ID field 506, a shared parameter index field 508, and script data 509. In general, task parameters 501 might include MTM-specific information for scheduling the incoming task (e.g., command type field 502, flow ID field 504, and virtual pipeline ID field 506). Task payload 503 might include task pointers 510 and task data 512. Task pointers 510 might point to addresses in system memory 210 storing data corresponding to the task. Task data 512 might include some of the data corresponding to the task (inline data). Command type field 402 identifies the task as a unicast task, an expanded unicast task, or a multicast task.

For a received unicast task, MTM 300 places at most one task in one of its queues in block 306. For each unicast task, the previous processing module in the virtual pipeline for the task (e.g., the one of accelerators 108 that provides the task to MTM 300) provides MTM 300 with a queue ID for the task to be placed in, for example a queue identified by flow ID field 504. For unicast tasks, virtual pipeline ID field 506 might be employed to correct packet length for scheduling of a packet corresponding to the task, for example by adding or subtracting the number of bytes corresponding to the value of field 506. In some embodiments, shared parameter index field 508 might include a pointer index to an entry in a shared parameter table of MTM 300 to run script data corresponding to the task.

The shared parameter table might be stored in one or more L1 caches 313 of MTM 300. The one or more L1 caches 313 of MTM 300 might operate substantially as described in related U.S. patent application Ser. Nos. 13/192,104 and 13/192,187, both filed Jul. 27, 2011. The shared parameter table might include one or more parameters for processing the unicast task, for example, shared parameters can be used to store state data (for example, statistics of MTM 300 such as packet count or byte count) based on an input metric (for example, counting all packets originating from a single port destined to a given queue of MTM 300). When MTM 300 receives a unicast task, a template merge operation is performed on the task that extracts MTM-specific fields from the task (e.g., command type field 502, flow ID field 504, and virtual pipeline ID field 506) and determines a queue for the task (e.g., a queue ID value from flow ID field 504). Buffer manager 302 also determines if MTM 300 can accept the new task for scheduling, for example if the queue of scheduling hierarchy 400 corresponding to the task is not filled beyond a threshold. If the task is accepted, the task is placed at the tail end of the corresponding MTM queue identified by flow ID field 504. If the task cannot be accepted by a queue of scheduling hierarchy 400, the task might be dropped and removed from the MTM pipeline. The threshold decision to determine whether a task can or cannot be accepted by a given queue might be performed by control software running on a microprocessor of network processor 100.

Expanded unicast tasks are tasks corresponding to unicast packets, but the task does not contain any a queue ID in flow ID field 504. Thus, the virtual pipeline down which the expanded unicast tasks were sent within network processor 100 terminates at MTM 300. MTM 300 determines one or more destination processing modules or a new virtual pipeline for the expanded unicast task. Multicast tasks are duplicated by multicaster 304 such that the task is stored in multiple queues of MTM 300 to be sent to multiple destinations. A multicast task includes a flow ID in field 504, which points to a sequence of expanded unicast flow IDs that are used when duplicating the task. Processing of unicast, expanded unicast, and multicast tasks might be performed by MTM 300 substantially as described in related U.S. patent application Ser. No. 13/232,422 filed Sep. 14, 2011, which is incorporated by reference herein.

Described embodiments might provide a reference count for data corresponding to a task. The reference count might correspond to a number of tasks, for example duplicate multicast tasks, that refer to the data. The reference count might incremented each time a task is duplicated corresponding to a multicast flow. However, in some embodiments, the reference count might not be incremented for each duplication of the task, but rather is incremented by n−1 for every n copies of the task. For example, in an exemplary embodiment, the reference count is incremented by 255 for the first duplication of the task, and is decremented by 256—number of copies for the last copy of the task. If there are more than 256 copies, then another increment is made for every 256th multicast copy.

Figure 6:
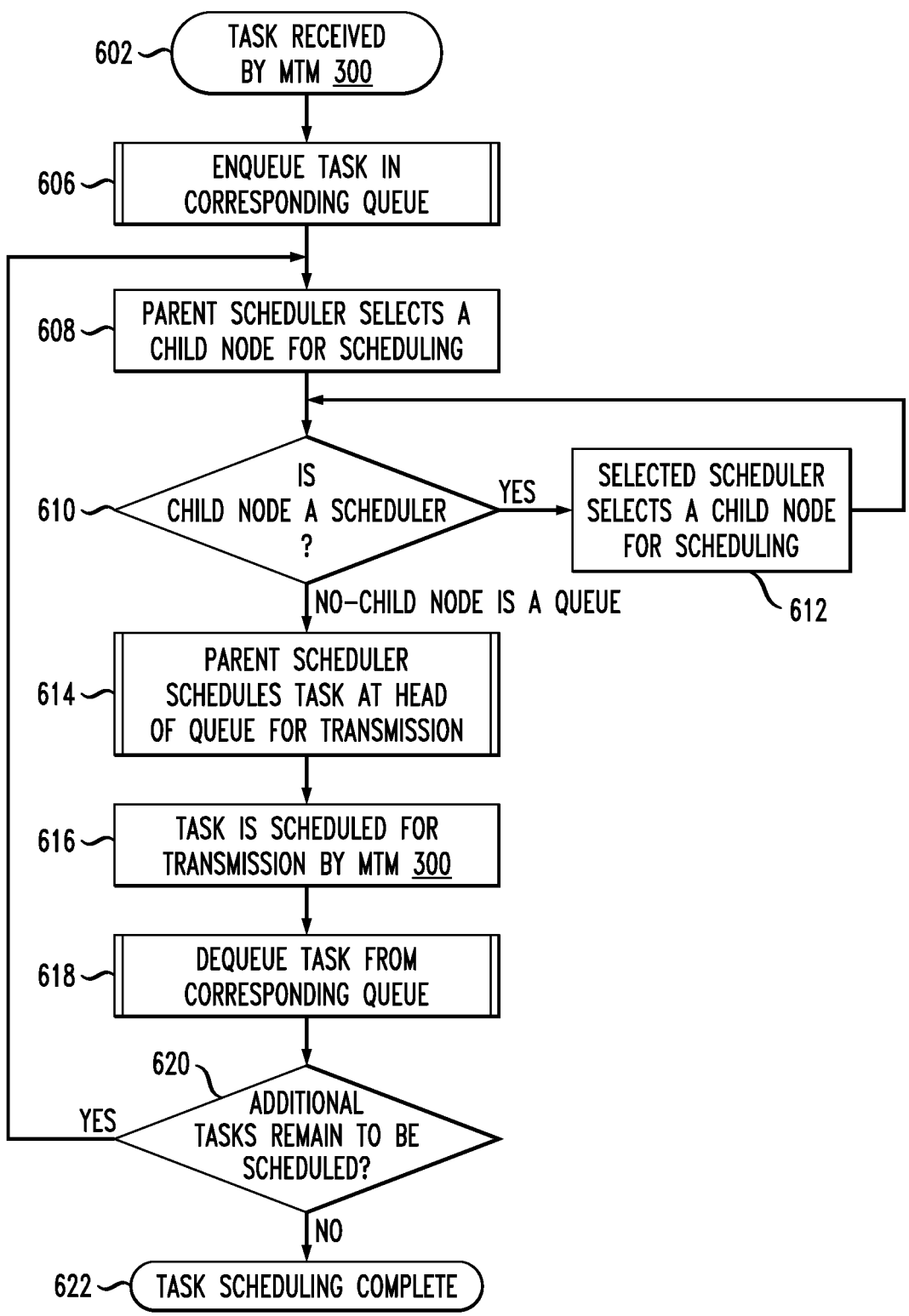
FIG. 6 shows a flow diagram of a task processing routine of the traffic manager of FIG. 3, in accordance with embodiments of the present invention.

FIG. 6 shows an exemplary logical flow diagram of task scheduling process 600 of MTM 300. As shown in FIG. 6, at step 602, a task is received by MTM 300, for example a task such as shown in FIG. 5, which is received from one of the processing modules of network processor 100 via communication ring 118. At step 606, the received task is added to the tail end of the corresponding queue. Step 606 is described in greater detail in regard to FIG. 7. At step 608, a top-level parent scheduler (e.g., root scheduler 402 of FIG. 4) of scheduling hierarchy 400 selects a child node for scheduling. In some embodiments of the present invention, root scheduler 402 might support up to 32 child nodes, all of which are schedulers. At step 608, one of the child schedulers is selected to schedule at least one available task for transmission by MTM 300. At step 610, if the selected child node is a scheduler, at step 612, the selected scheduler selects one of its child nodes to schedule at least one available task for transmission by MTM 300. Steps 610 and 612 might iteratively repeat until a leaf node (e.g., a queue) of scheduling hierarchy 400 is reached.

At step 610, once a queue is reached in scheduling hierarchy 400, at step 614, a task from the head of the selected queue is selected, and at step 616, the selected task is scheduled for transmission by MTM 300. For example, by iteratively selecting, at each scheduling level up scheduling hierarchy 400 from the scheduler that is the direct parent of the queue to root scheduler 402, root scheduler 402 selects a task for transmission by MTM 300. When root scheduler 402 selects a task, corresponding task data might be read from system memory 210, for example as described in regard to FIG. 16. At step 618, once the selected task is scheduled for transmission, the task is removed from the corresponding queue, and one or more statistics of each parent node corresponding to the queue might be updated to reflect that the task has been scheduled. The dequeuing operation of step 618 is described in greater detail with regard to FIG. 9. At step 620, if additional tasks remain in one or more of the queues of MTM 300, scheduling process 600 returns to step 608 to select another task for scheduling. If, at step 620, no additional tasks remain in one or more of the queues of MTM 300, scheduling process 600 proceeds to step 622, where the scheduling process completes until another task is received by MTM 300 at step 602. Although shown in FIG. 6 as being part of scheduling process 600, enqueue operation 606 and dequeue operation 618 might be substantially independent of each other, for example as finite state machines (FSMs) operating on an as-needed basis.

Considering the exemplary scheduling hierarchy shown in FIG. 4, to schedule a task stored in queue 406(3), at step 608, root scheduler 402 selects child scheduler 404(1), which corresponds to the scheduled task. At step 610, since the selected child node is a scheduler, at step 612, scheduler 404(1) selects child scheduler 404(3), which corresponds to the scheduled task. At step 610, since the selected child node is a scheduler, at step 612, scheduler 404(3) selects child scheduler 404(5), which corresponds to the scheduled task. At step 610, since the selected child node is a scheduler, at step 612, scheduler 404(5) selects child queue 406(3), which corresponds to the scheduled task. At step 610, since the selected child node is a queue, at step 614, scheduler 404(5) selects a task from the head of queue 406(3) for transmission by MTM 300 at step 616.

Figure 7:
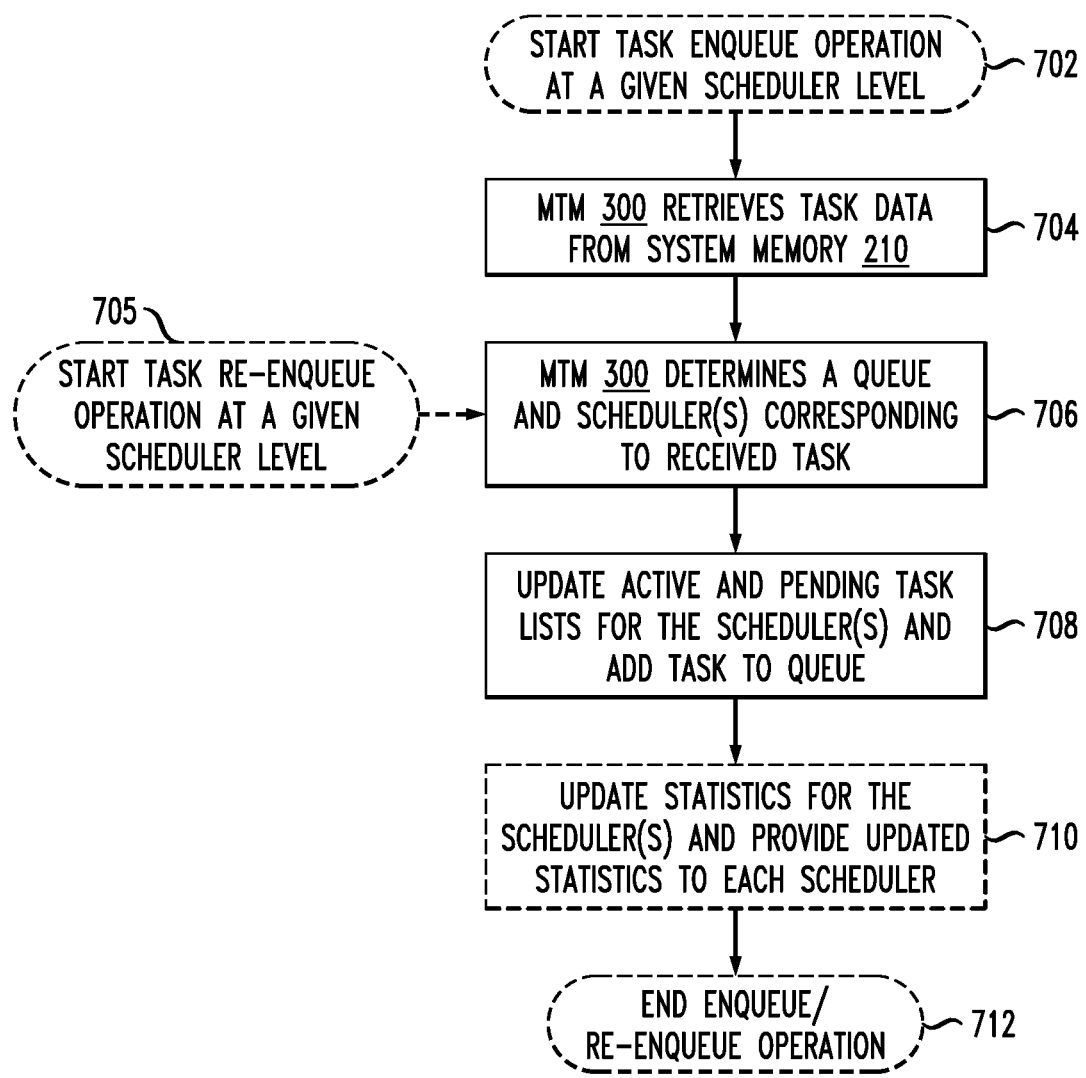
FIG. 7 shows a flow diagram of a task enqueue sub-process of the task processing routine of FIG. 6, in accordance with embodiments of the present invention.

FIG. 7 shows an exemplary detail of the enqueue operation of step 606. At step 702, task enqueue operation 606 starts for a given level of scheduling hierarchy 400. At step 704, MTM 300 retrieves control data corresponding to the received task from system memory 210. A queue might typically be allocated space in one of L1 caches 313 corresponding to the level of scheduling hierarchy 400 where the queue is located. At step 704, one or more data structures for control data corresponding to the received task read from system memory 210 might be stored in an allocated location of the L1 cache. For example, the L1 caches might be employed to store one or more data structures for each node of scheduling hierarchy 400, for example an active task list, a pending task list, a task counter, a head pointer and a next pointer of each scheduler. At step 706, MTM 300 determines a queue of scheduling hierarchy 400 corresponding to the received task, for example, a queue identified by flow ID field 504 of the received task. In some embodiments, flow ID field 504 might be a 24-bit ID field where an upper 4 bits are employed as an index to a scheduler mapping table. The scheduler mapping table might identify the level at which the incoming task should be queued. For example, the table might include a pointer to the corresponding queue. In general, tasks might be grouped together into queues based on certain rules of MTM 300.

At step 708, one or more lists corresponding to the parent scheduler(s) are updated corresponding to the received task. As will be described subsequently, lists such as an active task list and a pending task list might be employed to track the status of each node in scheduling hierarchy 400. At step 708, these lists might be updated to reflect the addition of the received task to the scheduling hierarchy. At step 710, statistics for each of the at least one parent schedulers are updated, such as the number of tasks under the scheduler, the amount of memory used, and one or more time values to determine an achieved scheduling rate for the corresponding child node. At step 712, task enqueue operation 606 ends. In some embodiments of the present invention, enqueue operation 606 might start at the queue level, and proceed upward through the scheduling hierarchy to root scheduler 402.

As indicated by the dashed lines for steps 702, 705 and 710, enqueue operation 606 might be substantially similar to a re-enqueue operation. As shown in FIG. 7, a re-enqueue operation for a given level of scheduling hierarchy 400 might start at step 705. A re-enqueue operation might occur when a scheduler or queue is temporarily removed from scheduling hierarchy 400, for example as will be described with regard to FIG. 8. A re-enqueue operation replaces the removed node in scheduling hierarchy 400, and the node is again made available for tasks to be scheduled from the corresponding node. As shown in FIG. 7, after a re-enqueue operation starts at step 705, at step 706, MTM 300 determines a queue of scheduling hierarchy 400 corresponding to the re-enqueue operation. In the case of a re-enqueue operation, a queue ID value might be included in the re-enqueue request. At step 708, one or more status lists corresponding to the parent scheduler(s) are updated corresponding to the re-enqueue operation to reflect the tasks that are added back into scheduling hierarchy 400. As indicated by the dashed line, step 710 might optionally be performed for a re-enqueue operation, since one or more statistics for each of the at least one parent schedulers might not be changed due to the re-enqueue operation. At step 712, the re-enqueue operation ends. In some embodiments of the present invention, the re-enqueue operation shown in FIG. 7 might proceed iteratively upward through the scheduling hierarchy from the node level being re-added into the scheduling hierarchy to root scheduler 402.

Figure 8:
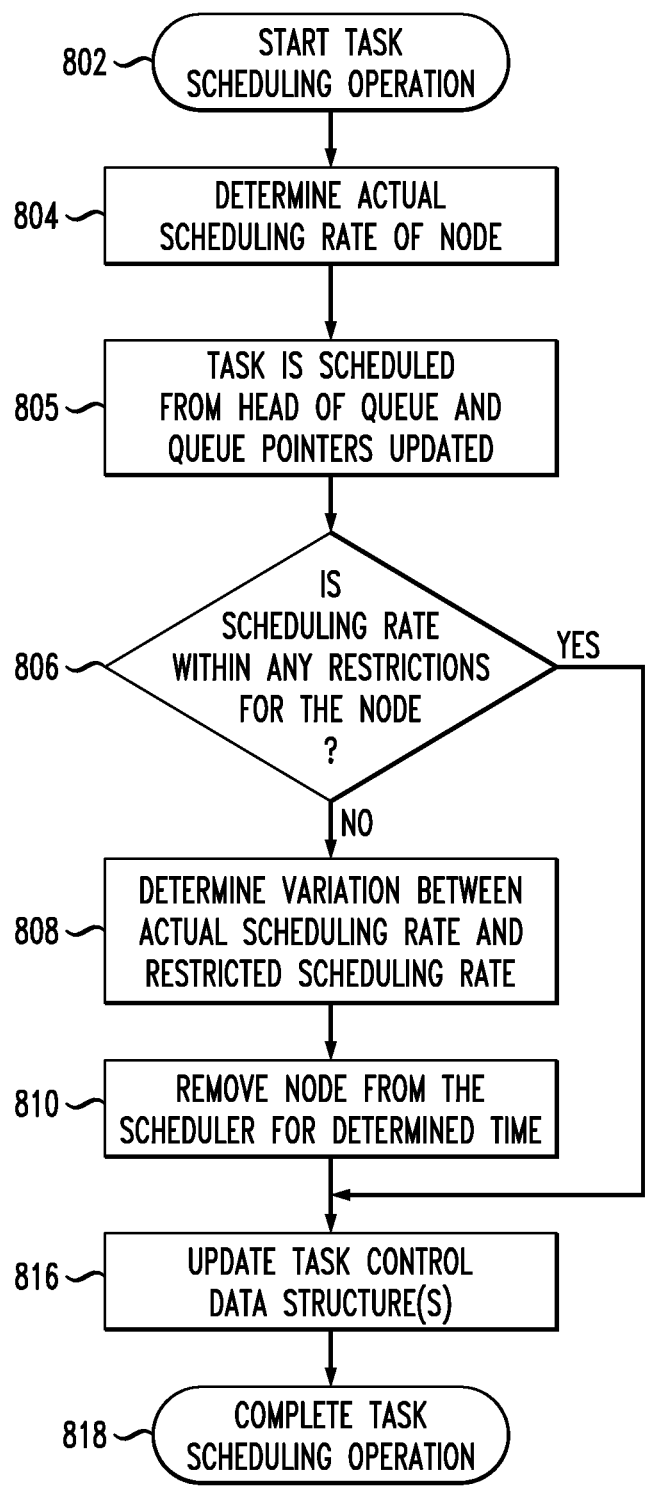
FIG. 8 shows a flow diagram of a task scheduling sub-process of the task processing routine of FIG. 6, in accordance with embodiments of the present invention.

FIG. 8 shows an exemplary embodiment of the scheduling operation of step 614. At step 802, task scheduling operation 614 starts. At step 804, MTM 300 determines an actual packet scheduling rate of the corresponding scheduler and corresponding queue. At step 805, a task from the head of the corresponding queue is scheduled for transmission by the corresponding scheduler, and one or more pointers for the corresponding queue are updated to reflect a new head entry. At step 806, if the actual packet scheduling rate determined at step 804 is within a predetermined rate restriction for the corresponding scheduler and queue, then sub-process 614 continues to step 816, where one or more task control data structures corresponding to the scheduled task are updated, for example iteratively at each parent scheduler in scheduling hierarchy 400 corresponding to the task. At step 818, task scheduling sub-process 614 completes.

At step 806, if the actual packet scheduling rate determined at step 804 is not within a predetermined rate restriction for the corresponding scheduler and queue, then sub-process 614 continues to step 808. One or more predetermined rate restrictions might be set in a given system. For example, certain types of data traffic might be prioritized or de-prioritized, thus queues and/or schedulers corresponding to different types of traffic might have one or more corresponding rate restrictions to limit maximum packet/data throughput for given traffic types. At step 808, the difference between the actual packet scheduling rate determined at step 804 and the predetermined rate restriction is determined. This difference corresponds to an amount of time that the scheduler or queue should be removed from the scheduling hierarchy at step 810, such that queued tasks can not be scheduled from the given scheduler or queue. After the determined time elapses at step 810, the node exceeding the scheduling rate is re-enqueued in the scheduling hierarchy, for example by the re-enqueue operation shown in FIG. 7, and the node is again made available for tasks to be scheduled from the corresponding node. During the amount of time that the given node is removed from scheduling hierarchy 400, tasks might be scheduled from other nodes of the hierarchy, for example by operating as shown in FIG. 8 on another node of scheduling hierarchy 400. Sub-process 614 continues from step 810 to step 816, where one or more task control data structures corresponding to the scheduled task are updated, for example iteratively at each parent scheduler in scheduling hierarchy 400 corresponding to the task. At step 818, task scheduling sub-process 614 completes.

Figure 9:
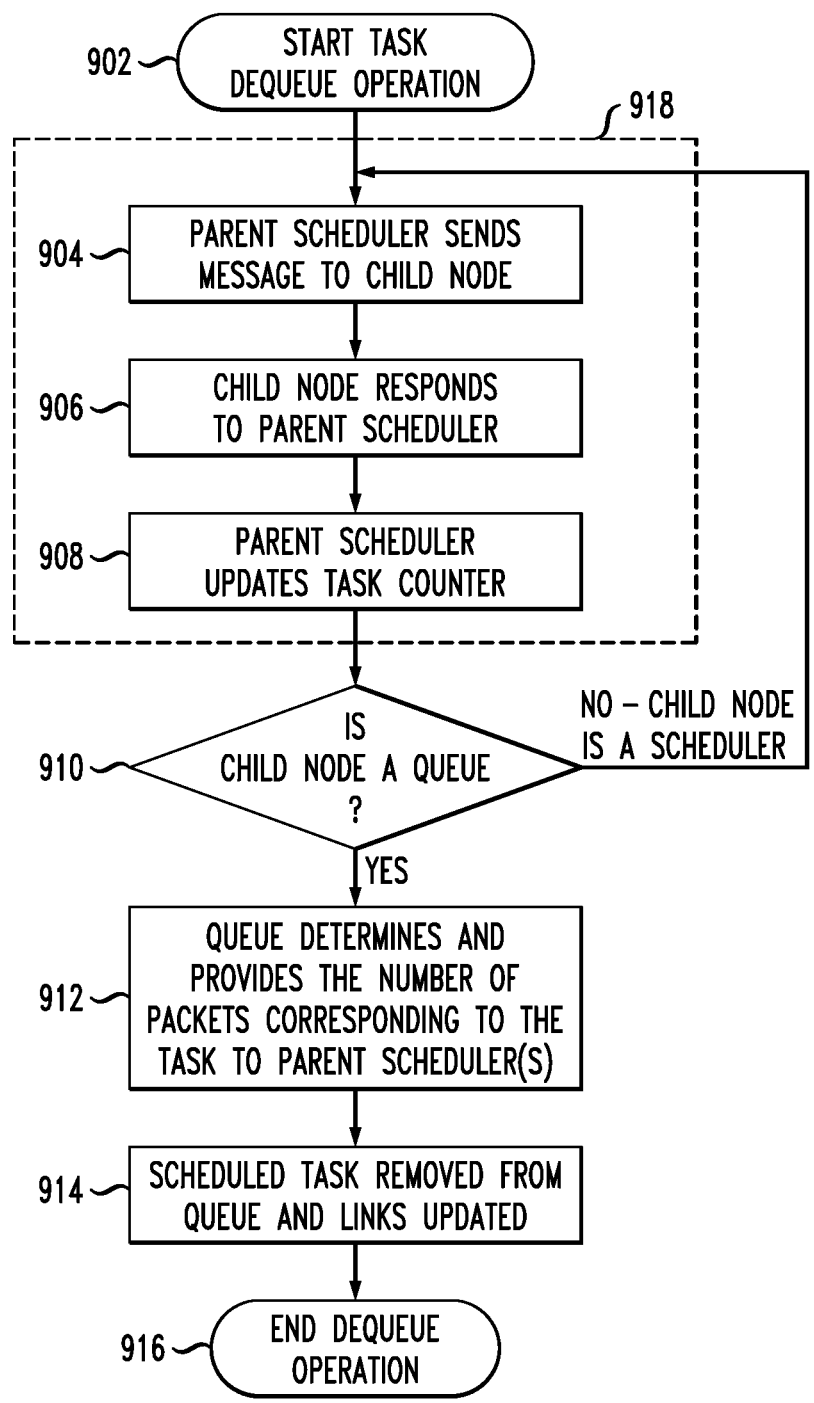
FIG. 9 shows a flow diagram of a task dequeue sub-process of the task processing routine of FIG. 6, in accordance with embodiments of the present invention.

When a task is available for scheduling at the top of scheduling hierarchy 400, the scheduler at the top level (e.g., root scheduler 402) schedules the task for transmission. As shown in FIG. 6, upon scheduling the task for transmission, MTM 300 might initiate a dequeue operation to remove the scheduled task from its corresponding queue in scheduling hierarchy 400, for example at step 618. FIG. 9 shows an exemplary flow diagram for dequeue sub-process 618. Dequeue process 618 starts at step 902. At step 904, the parent scheduler sends a message to a child node corresponding to the task indicating that the task has been scheduled for transmission, as will be described in greater detail subsequently. At step 906, the selected child node responds to the parent scheduler, for example with a value by which to update the parent task counter at step 908. At step 910, if the child node is a queue, it corresponds to the lowest level of that branch of scheduling hierarchy 400 (e.g., queues are leaf nodes; as shown in FIG. 4, exemplary queues 406(1)-406(9) are each the last node in their respective branches of scheduling hierarchy 400). If the child node is a queue, and, thus, the lowest level of the scheduling hierarchy, at step 912, the number of packets to be scheduled for transmission corresponding to the task is determined and provided to each scheduler corresponding to the queue. At step 914 the scheduled task is removed from the corresponding queue. At step 916, dequeue sub-process 618 completes. If, at step 910, the child node is not a queue, the child node is a scheduler, and dequeue sub-process 618 returns to step 904 to process the parent-child messages for this subsequent level of scheduling hierarchy 400. Steps 904 through 910 might iteratively repeat until, at step 910, the child node is a leaf node (e.g., the queue corresponding to the task). Each parent-child communication cycle is a "scheduling cycle" of MTM 300. As indicated by dashed line 918, a scheduling cycle is completed when the child node responds to the top level scheduler. Thus, for a given task, multiple scheduling cycles might be required to perform a dequeue operation to remove a scheduled task from a corresponding queue of the scheduler depending on the number of schedulers between the top level scheduler (e.g., root scheduler 402) and the corresponding queue. In some embodiments of the present invention, dequeue operation 618 might start at root scheduler 402 and proceed downward through the scheduling hierarchy to the queue level.

Considering the exemplary scheduling hierarchy shown in FIG. 4, if a task from queue 406(3) is scheduled for transmission by MTM 300 of corresponding packets, at step 618, the scheduled task is dequeued from queue 406(3). The highest level scheduler in scheduling hierarchy 400 is root scheduler 402. At step 904, root scheduler 402 sends a message to its child scheduler 404(1), which corresponds to the scheduled task. At step 906, scheduler 404(1) responds to root scheduler 402, and at step 908, root scheduler 402 updates its corresponding task counter, ending a first scheduling cycle. At step 910, since scheduler 404(1) is not a queue, process 618 returns to step 904. At step 904, scheduler 404(1) sends a message to its child scheduler 404(3), which corresponds to the scheduled task. At step 908, scheduler 404(3) responds to scheduler 404(1), and at step 908, scheduler 404(1) updates its task counter, ending a second scheduling cycle. Again, at step 910, since scheduler 404(3) is not a queue, process 618 returns to step 904. At step 904, scheduler 404(3) sends a message to its child scheduler 404(5), which corresponds to the scheduled task. At step 908, scheduler 404(5) responds to the message from scheduler 404(3), and at step 908, scheduler 404(3) updates its corresponding task counter, ending a third scheduling cycle. Again, at step 910, since scheduler 404(5) is not a queue, process 618 returns to step 904. At step 904, scheduler 404(5) sends a message to its child queue 406(3), which corresponds to the scheduled task. At step 906, queue 406(3) responds to the message from scheduler 404(5), and at step 908, scheduler 404(5) updates its corresponding task counter, ending a fourth scheduling cycle. At step 910, since queue 406(3) is reached, at step 912, the number of packets to be scheduled for transmission corresponding to the task are determined and provided to schedulers 404(1), 404 (3), 404(5) and root scheduler 402. At step 914 queue 406(3) removes the scheduled task from its linked list, for example by updating one or more pointers corresponding to queue 406(3) in schedulers 404(1), 404(3), 404(5) and root scheduler 402. At step 916, dequeue sub-process 618 completes.

Thus, as described herein, MTM 300 might perform an enqueue operation (FIG. 7) or a re-enqueue operation (step 812 of FIG. 8) to add a task to scheduling hierarchy 400. The enqueue operation is performed when a task arrives at the input of MTM 300. The re-enqueue operation is performed when a node of scheduling hierarchy 400 satisfies scheduling rate shaping constraints and tasks of the node can be made available for transmission by MTM 300. MTM 300 might perform a dequeue operation (FIG. 9) to remove a task from scheduling hierarchy 400. The dequeue operation is performed when a scheduler has tasks scheduled for transmission by MTM 300.

Described embodiments of MTM 300 might speculatively schedule, in a superscalar manner, more than one task in a clock cycle to achieve a scheduling rate higher than when scheduling a single task in the clock cycle. As described herein, embodiments of the present invention employ a scheduling hierarchy that is a tree structure of schedulers and queues. As described, each scheduler might have zero or more child schedulers 404 or queues 406, where schedulers are branch nodes and queues are leaf nodes of scheduler tree 400. Each queue 406 might comprise a linked list of tasks being processed by network processor 100. As described, when a task is received by MTM 300, the task is added to the tail end of a corresponding queue, and one or more parent schedulers corresponding to that queue are updated throughout the tree structure corresponding to the newly arrived task.

Described embodiments thus might increase the throughput of each scheduler in the scheduling hierarchy by scheduling multiple tasks in each scheduling cycle. Some embodiments might allow a parent scheduler to schedule multiple tasks from a child node (which can be either a scheduler or a queue) in each scheduling cycle. The child node responds to the parent scheduler indicating whether the scheduling of the tasks has been accepted, and if so, how many tasks are accepted. The number of scheduled tasks propagates through the scheduling hierarchy from the queue through its parent scheduler up to the root scheduler at the top of the scheduler hierarchy. Data structures are maintained at each scheduler and queue, and might be updated to reflect the updated task counter.

Referring to FIG. 7, during task enqueue operation 606, the queue structure is updated with the new task(s) being added to its tail at step 708. At step 710, statistics at the queue are updated to reflect the new task counts and memory usage for corresponding task data. The parent scheduler is informed of the new task(s) through updated statistics (step 710) such as the task count. Steps 708 and 710 are repeated at each of the higher levels of scheduling hierarchy 400 until root scheduler 402 is updated. Re-enqueue operations are similar, but typically start at the level of scheduling hierarchy 400 containing the node satisfying the constraints and being made available for scheduling.

A task dequeue operation, such as shown in FIG. 9, occurs after the corresponding scheduler schedules one or more tasks from one of its child nodes (e.g., at step 614). As described herein, each scheduler might employ a selected arbitration algorithm to select the child from which tasks are scheduled and sends a message to the child node (a scheduler or a queue) indicating that a task is scheduled for that child (e.g., at step 904). The child responds to the schedule message indicating whether the child accepted the schedule (e.g., at step 906). Based on the child's response, the parent scheduler updates its own corresponding task count for that child (e.g., at step 908). In some instances, step 908 might also include the parent scheduler waiting a predetermined amount of time before scheduling the task, for example to maintain a desired traffic shaping rate. During this wait time, the parent scheduler might begin execution on a new task schedule operation handed down by its parent. Thus, each scheduler of scheduling hierarchy 400 is multithreaded to increase the throughput of scheduling packets by MTM 300. Further, each scheduling level might simultaneously work on a different scheduling task affecting different nodes of scheduling hierarchy 400 due to the pipelined nature of the scheduling process (e.g., as shown in FIGS. 6-9).

After step 908, a scheduling cycle is complete and the parent scheduler can begin a new scheduling cycle (e.g., at step 904). Also, on receiving a schedule message from the parent (e.g., at step 904), the child node starts its own scheduling cycle to communicate to its own child node corresponding to the scheduled task(s) (e.g., at step 904). Once a queue is reached as the child node (e.g., at step 910), characteristics about the data corresponding to the scheduled task, the data flow, and the destination receiver are determined (e.g., at step 912). For example, the queue might determine the actual amount of data corresponding to the scheduled task(s), the number of tasks that can be scheduled, and might indicate a desired data rate of the data flow and destination receiver. The corrected number of tasks to be scheduled is propagated through scheduling hierarchy 400 to update the number of tasks available for scheduling at each node.

Described embodiments provide a method of implementing byte accurate scheduling of tasks from a queue when the size of a packet corresponding to the task (e.g., the amount of data to be transmitted by MTM 300) is not known at the time of scheduling. Task scheduling rules such as shaping rates and arbitration rules are applied at each level of the hierarchy, and preferably these rules are applied in a byte accurate fashion. As described herein, queues are collections of tasks waiting to be scheduled at a specific rate and schedulers are any combination of queues and other schedulers. Described embodiments typically schedule queues or schedulers using a "default packet size" and then correct the various scheduler algorithms using a "task update" when the actual size of the packet being scheduled is known. The actual packet size might be greater than or less than the default packet size, and the task update might indicate the difference between the default packet size and the actual packet size.

When the scheduler runs, the default packet size might be used to perform traffic shaping and arbitration. In some embodiments, traffic shaping might be based on a desired data rate for traffic of a given queue or scheduler, and arbitration might be based on a Deficit Weighted Round Robin (DWRR) or a Smooth Deficit Weighted Round Robin (SDWRR), described subsequently. The scheduling proceeds down the scheduling hierarchy from the root scheduler to a chosen queue. Once a task is chosen from a queue, the data packet corresponding to the task is read from system memory 210, and the queue sends a task update message to each scheduler up to the root scheduler indicating the actual size of the packet data corresponding to the task. When the task update message is received by a scheduler, each scheduler updates its traffic shaping control data (e.g., leaky token buckets) and arbitration control data (e.g., DWRR buckets) to account for the difference between the default packet size and the actual packet size, for example at step 816 of task scheduling sub-process 614 of FIG. 8. The task update message might include two packet size correction fields, one to be applicable for a scheduler and one to be applicable for the task. For example, the first packet size correction field might be employed for updating the packet size at each scheduler, and the second packet size correction field might be employed to indicate that the packet corresponds to a data protocol that might change the packet size downstream from MTM 300, but before transmission by network processor 100 (e.g., by adding a checksum, encryption, or at other protocol layers, etc.).

In some embodiments, the default packet size might be set by control software running on a processor of network processor 100. Each scheduler includes an associated default packet data size value. The default packet data size might be employed to perform speculative read operations, as described subsequently. In embodiments of the present invention, the default packet data size value is defined for each scheduler as an integer multiple of 16 byte increments (e.g., N*16 B), where N is the default packet scale value of the scheduler. Further, the value of N might be set by control software of network processor 100.

As described herein, one or more schedulers within scheduling hierarchy 400 might employ a smooth deficit weighted round robin (SDWRR) arbitration algorithm. In some embodiments, SDWRR arbitration might be employed by root scheduler 402 to perform fast scheduling of tasks available at its children schedulers. Since root scheduler 402 schedules every task within MTM 300, root scheduler 402 beneficially schedules each task from a child as fast possible, and moves on to the next child that has tasks available for scheduling. To reduce the time required to schedule each task, root scheduler 402 beneficially employs relatively small data structures and little control logic to issue up to one new schedule every cycle.

Figure 10:
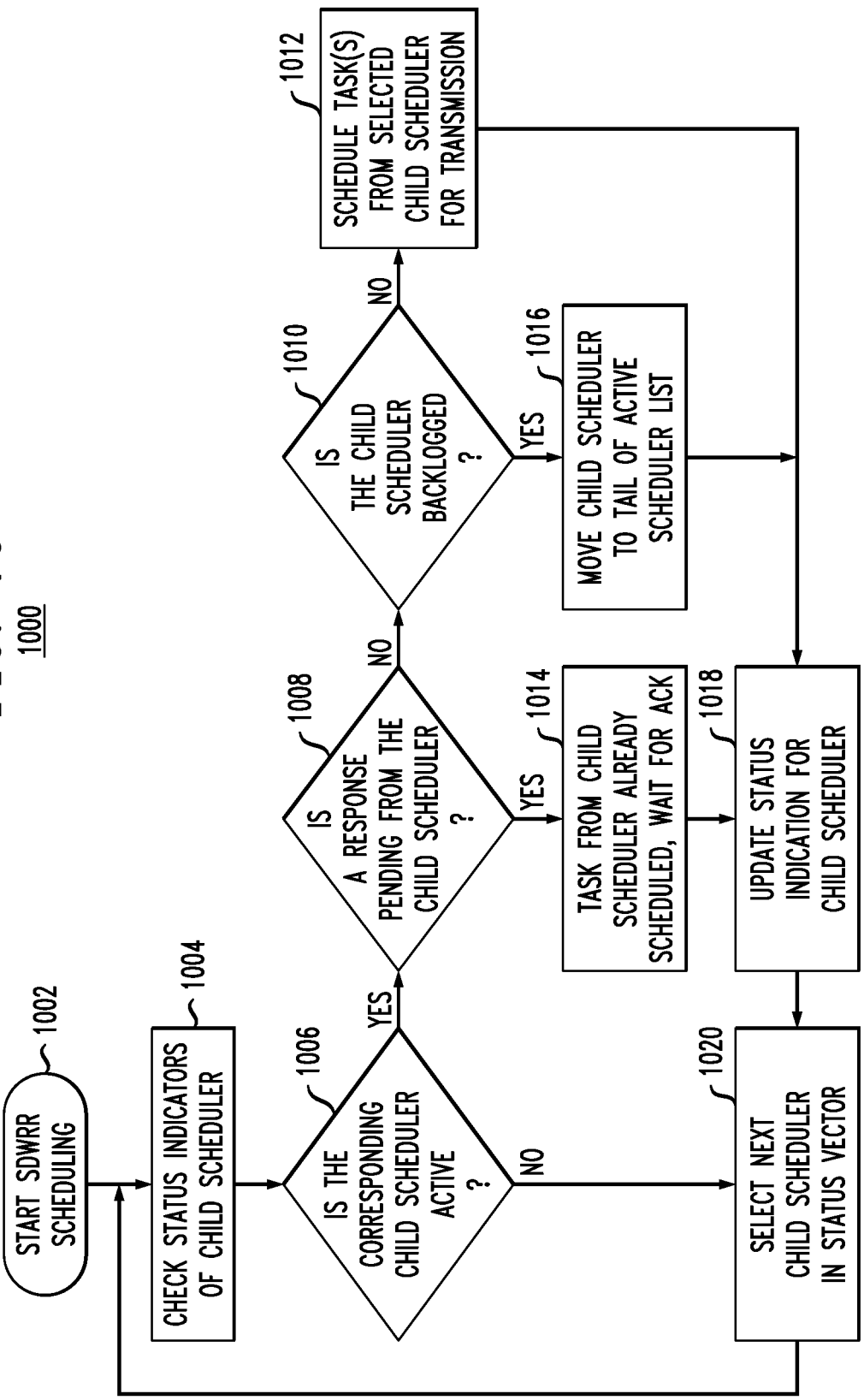
FIG. 10 shows a flow diagram of an exemplary round robin scheduling process of the traffic manager of FIG. 3, in accordance with embodiments of the present invention.

FIG. 10 shows an exemplary flow diagram of SDWRR arbitration routine 1000 of root scheduler 402. At step 1002, SDWRR arbitration routine starts, for example at startup of MTM 300. At step 1004, root scheduler 402 checks the status of one or more indicators of a first child scheduler (e.g., a first one of level-one schedulers 404(1) and 404(2) from example scheduling hierarchy 400 of FIG. 4). In some embodiments, each scheduler in scheduling hierarchy 400 might be assigned a scheduler ID value, and root scheduler 402 might typically support a fixed number, N, of level-one schedulers. In some embodiments, N is 32. In such embodiments, each of the 32 level-one schedulers might employ contiguous ID values such that level-one schedulers have ID values from a base scheduler ID value up to the base scheduler ID value+31. A status indicator for the level-one child schedulers might include one or more indicators that root scheduler 402 employs to determine a current status of each level-one scheduler. For example, status indicators might include one or more N-bit vectors, where each bit in each N-bit vector corresponds to a given level-one scheduler. For example, a first bit vector might indicate that a level-one scheduler is active, a second bit vector might indicate that a level-one scheduler is backlogged, and a third bit vector might indicate that a response to root scheduler 402 from the child scheduler is pending. An active scheduler is one having one or more tasks queued for scheduling. A pending scheduler is one that root scheduler 402 has scheduled, but has not yet responded to root scheduler 402. A backlogged scheduler is one that has exceeded its arbitration scheduling limit (e.g., the data rate for the corresponding data has reached its traffic shaping limit). Each child queue and scheduler has a corresponding arbitration scheduling limit.

At step 1006, root scheduler 402 determines whether the selected scheduler ID value is an active scheduler, for example by checking the active bit vector value corresponding to the selected scheduler. In some embodiments, root scheduler 402 might start at the lowest scheduler ID value and increment the value, proceeding upward to the highest scheduler ID value before returning to the lowest scheduler ID value, and so on, although other implementations are possible. At step 1006, if the selected child scheduler is inactive, SDWRR algorithm 1000 proceeds to step 1020, where the next scheduler is selected, and processing returns to step 1004 to check the status of the newly selected scheduler. At step 1006, if the selected child scheduler is active, SDWRR algorithm 1000 proceeds to step 1008.

At step 1008, if the child scheduler has been scheduled, but a response has not yet been sent to root scheduler 402, then the child scheduler is pending, and SDWRR algorithm 1000 proceeds to step 1014. At step 1014, root scheduler 402 waits for an acknowledgement signal from the child scheduler before processing the corresponding child scheduler. In some embodiments, root scheduler 402 might process other active children while waiting for a response from the corresponding child scheduler. At step 1018 the one or more status indicators corresponding to the selected scheduler are updated. If, at step 1008, the child scheduler is active, but no response is pending to root scheduler 402, then SDWRR algorithm 1000 proceeds to step 1010. At step 1010, if the selected child scheduler is backlogged, at step 1016, the selected scheduler might be moved to the tail end of the active scheduler list such that other child schedulers are selected before the backlogged scheduler is selected again. Alternatively, the selected scheduler might be moved off the active list and placed on a backlogged list. If, at step 1010, the selected child scheduler is not backlogged, at step 1012, one or more tasks from the selected child scheduler are scheduled for transmission by MTM 300. In general, root scheduler 402 might select one or more tasks from the child scheduler at the head of the active list.

Once a task is scheduled from a child scheduler at step 1012, at step 1018 the one or more status indicators corresponding to the selected scheduler are updated. For example, the selected child scheduler might remain in the active list (if it has not reached its corresponding arbitration limit and, thus, is not backlogged), or the selected child scheduler might be moved to the pending list (if a response to the scheduling of step 1012 is not yet received from the selected child scheduler), or the selected child scheduler might be added to a backlogged list (if the selected child scheduler is backlogged). In some embodiments, the pending list and backlogged list might be implemented as one list. When the child scheduler is added to the pending list, its arbitration limit might be restored, and the child scheduler is added back to the active list once it is below its corresponding shaping rate and it has tasks available for scheduling. If the active list becomes empty, the pending list might become active before the shaping rate is reached. If a child scheduler becomes empty, having no tasks left to schedule, the child scheduler ID value might be provided to timer and clock interface 320 for further processing. Once the status indicators are updated, SDWRR algorithm 1000 proceeds to step 1020, where the next scheduler is selected, and processing returns to step 1004 to check the status of the newly selected scheduler.

In an exemplary embodiment, root scheduler 402 might employ a 5-bit pointer indicating the next child scheduler to be selected from up to 32 child schedulers. To select a new child for scheduling, root scheduler 402 might search through the status bit vectors from the pointer value to the highest scheduler ID value to look for a next scheduler ID value having its corresponding active indicator set without having a corresponding pending indicator or backlogged indicator set (e.g., at steps 1004, 1006, 1008 and 1010). Upon scheduling a scheduler (e.g., at step 1012), the pointer value is updated to the next contiguous scheduler ID value from the selected scheduler (e.g., at step 1018). If no scheduler ID value between the pointer value and the highest scheduler ID value can be scheduled, then child schedulers having ID values between the lowest scheduler ID value and the pointer value can be selected for scheduling (e.g., at step 1012). This technique provides smoothness of the arbiter by providing every child scheduler with a chance to be scheduled before the same child scheduler can be picked for consecutive scheduling cycles.

At step 1012, root scheduler 402 sends a scheduling event to the selected scheduler (e.g., the scheduler having an ID value equal to base Si scheduler ID+selected scheduler offset). The selected child scheduler sends a response to root scheduler 402 (e.g., at step 1014). In the response, the selected child scheduler might indicate that the child scheduler should become (1) backlogged and inactive (e.g., the child scheduler has reached its traffic shaping rate), (2) should become inactive and be removed from scheduling hierarchy 400 (e.g., the child scheduler has become empty), or (3) that the child scheduler should remain active (e.g., the child scheduler has not yet reached its traffic shaping rate and is not backlogged). Thus, SDWRR algorithm 1000 is weighted, in that each child scheduler indicates in its response whether it needs to be taken out of the arbitration due to constraints such as the shaping rate for that child, etc. Steps 1004, 1006, 1008, 1010, 1012 and 1018 might typically be performed in a single scheduling cycle of MTM 300, thereby achieving a fast scheduling rate compared to other SDWRR implementations requiring multiple tens or hundreds of cycles for each schedule operation.

Described embodiments track the number of tasks to be scheduled by each node in scheduling hierarchy 400 by localized message passing and a capped task count. Each node of scheduling hierarchy 400 reports "capped" task count value to its parent scheduler. Each node might employ a "parent view" data structure to track the task count previously reported to the parent scheduler. Each node of scheduling hierarchy 400 beneficially tracks how many tasks are under it, so scheduling occurs for each task. Since a given node might have several child nodes under it in its subtree of scheduling hierarchy 400, the number of tasks under a given parent node might be very large (several millions). Thus, maintaining an absolute packet count at every node of scheduling hierarchy 400 could require very large counters. Also, described enqueue (e.g., FIG. 7) and dequeue (e.g., FIG. 9) processes are not necessarily instantaneous, and task counts are desirably updated accurately. Described embodiments beneficially limit the size of task counters at each scheduling level by limiting the task count size, and account for potentially simultaneous enqueue and dequeue operations along a branch in scheduling hierarchy 400.

Each queue in scheduling hierarchy 400 might maintain an absolute task count. Each child node in scheduling hierarchy 400 communicates a "capped" task count to its corresponding parent scheduler. The "capped" task count might be equal to the task count of the child node, but might be limited to no greater than a fixed value. In some embodiments, the fixed value is 15, such that if the task count is less than or equal to 15, then the capped task count is equal to the actual number of tasks, otherwise, the task count is set to a maximum value of 15. Task counts are transferred between child nodes and parent nodes by localized handshake messages such that the task count is only transferred from a child to parent. Task count data is transferred from the bottom level of scheduling hierarchy 400 to the top of scheduling hierarchy 400 by local exchange of messages, one level at a time.

Each node of scheduling hierarchy 400 maintains a "parent view" data field. The parent view field specifies the task count of the child node from the parent scheduler's point of view (e.g., the task count reported by the child to the parent scheduler). The parent view task count might differ from the actual task count for one of several reasons: (i) the task count of the child node is capped at the maximum reported task count, (ii) the task count of the child node is below the capped value but the task count of the child node changed after the last handshake message to its parent scheduler, or (iii) the child node is being removed from scheduling hierarchy 400, for example, for traffic shaping.

During task enqueue operations (e.g., FIG. 7), each child node sends a message to its parent scheduler to increment the task count (e.g., at step 710) if the task count is below the capped value. If the task count exceeds the capped value, the task count of the parent scheduler is not incremented. As described herein, task enqueue operations start at the queue level and proceed up scheduling hierarchy 400 to root scheduler 402. The task count is updated as described at each level of scheduling hierarchy 400. Re-enqueue operations might be substantially similar, but might start at any corresponding level of scheduling hierarchy 400 and might increment the task count by a value greater than 1.

During task dequeue operations (e.g., FIG. 9), the process starts at the top of scheduling hierarchy 400 at root scheduler 402. When a parent schedules a child node, the parent sends a message to the child node (e.g., at step 904), and the child node responds (e.g., at step 906) to the parent indicating an amount to increment or decrement the parent's task count (e.g., at step 908). The child node determines this value by comparing its "parent view" data field to its task count value, and the number of tasks to be scheduled. As will be described, a child might schedule one or more tasks in a cycle. In one embodiment, a child might schedule 0, 1 or 2 tasks per scheduling cycle. Additionally, a child might remove itself from its parent, for example due to traffic shaping requirements, in which case, the child node decrements the parent task count by the parent view value (e.g., reports a task count of 0 since no tasks are eligible for scheduling).

Employing a capped task count at each parent scheduler level allows the counters at the parent levels to be bounded to known, relatively small values (and thus, an arbitrarily large counter is not required to support the several millions of tasks that could potentially be in a given scheduling branch). Further, local parent-child messaging to determine task counts at each level of scheduling hierarchy 400 beneficially de-centralizes the tracking of task counts. Employing the parent view data field allows updating the parent with a new task count value even if the corresponding scheduling operations are not complete.

Each scheduler in scheduling hierarchy 400 is a configurable arbiter and rate enforcer for tasks assigned to queues and child schedulers from one level to the next higher level of scheduling hierarchy 400. To achieve desired scheduling rates for multiple different traffic flows, scheduling hierarchy 400 might provide for up to N scheduling levels of queues and schedulers below root scheduler 402. In some embodiments, N is 6 levels for scheduling hierarchy 400. Each level in scheduler hierarchy 400 might have substantially similar characteristics (e.g., each scheduler 404 might operate substantially similarly and each queue node 406 might operate substantially similarly), while root scheduler 402 operates as a special case as described, for example, with regard to FIG. 10. In embodiments employing 6 scheduling levels, level 0 is the top scheduling level and generally has only one scheduler, root scheduler 402. In some embodiments, level 1 might have only schedulers (no queues), and levels 2 to 5 might have any number of queues and schedulers up to a predefined maximum number of child nodes under a single parent scheduler, which in some embodiments is a maximum of 64 k child nodes. Level 6 might only have queues, since it is the lowest level of scheduling hierarchy 400.

As described herein, scheduling hierarchy 400 is a tree structure of schedulers at higher levels and queues as leaf nodes. A queue is a structure with a list of tasks that serves as an entry point for tasks into the scheduling hierarchy. A queue might exist at any level of the scheduling hierarchy, although in some embodiments, only schedulers might be children of root scheduler 402. In described embodiments, scheduling hierarchy 400 might be implemented as any hierarchical configuration (symmetric or asymmetric), up to hardware defined maximum level of schedulers, through static configuration and dynamic configuration updates during operation of network processor 100.

In described embodiments, queues might be added under any level of scheduling hierarchy 400 other than root scheduler 402, and the total number of queues in scheduling hierarchy 400 might be unlimited for practical purposes (e.g., several millions of queues), limited only by the maximum value of the queue ID value, and the size of system memory 210 for storing data corresponding to queued tasks. Queues might be dynamically added or deleted in scheduling hierarchy 400 during operation of network processor 100 by adding or removing a queue ID value from the active, pending and backlogged status indicators of the corresponding one or more parent schedulers. As described herein, schedulers might be added at any level of scheduling hierarchy 400 and consist of queues and schedulers under it. The number of schedulers supported by scheduling hierarchy 400 might also be relatively large (e.g., several millions). In some embodiments, each scheduler node might support a maximum of 64 k children queues and schedulers. Each level in the scheduling node performs two functions: (i) arbitrating between the children of this particular node to pick a winner for scheduling, and (ii) traffic shaping the particular node to a particular data rate. These functions might be performed by hardware logic circuits, or might be performed under software control using a traffic shaper script of MTM 300.

One or more configurable mapping tables are employed to map a received task to a flow ID to a given queue of scheduling hierarchy 400. The one or more configurable mapping tables might be dynamically created and updated during operation of network processor 100. During operation of network processor 100, scheduling hierarchy 400 might be populated with one or more schedulers and queues to receive incoming tasks. The amount of data stored in system memory 210 corresponding to tasks queued in scheduling hierarchy 400 changes during operation corresponding to the incoming and transmitted tasks. Scheduling hierarchy 400 might be modified dynamically during the runtime, for example, by draining a particular branch of scheduling hierarchy 400, or by adding a branch of one or more schedulers and queues to scheduling hierarchy 400. In described embodiments, the queue and scheduler data structures might be 64-byte data structures stored in system memory 210 to align with the line sizes of the memory and caching data structures. Queue Engine 308 performs the maintenance of the data structures of scheduling hierarchy 400 in system memory 210.

Each data flow has an associated ID value. In an exemplary embodiment, the flow ID is a 24-bit value where the upper 4 bits index into a level mapping table of MTM 300. The level mapping table defines the level of scheduling hierarchy 400 where the data flow should be queued, and includes a parent ID value, which is a pointer to a location in system memory 210 storing the data structure for the parent scheduler for the flow ID. The parent ID value and the lower 20-bits of the flow ID value determine the physical memory address of the corresponding scheduler data structure. Thus, the scheduling hierarchy allows for arbitrary configuration of queues, in terms of the number of queues at a given level of scheduling hierarchy 400, and the level of scheduling hierarchy 400 of the parent scheduler of the queue. In addition to hierarchy information, the scheduler data structures might also contain traffic shaping data such as constraints on the maximum peak and sustained data rates allowed for the particular node. The structures might also store state data, such as a time value for the last task transmission and an amount of system memory 210 used to store task data, for use in deciding when the node should be allowed for scheduling a next time.

For fully populated levels of hierarchy, a new queue might typically be inserted to the scheduling hierarchy at the lowest level (e.g., level 6, as shown in the exemplary hierarchy of FIG. 4). If the queue structure indicates that the parent scheduler is at a higher level (e.g., a level 3 scheduler such as scheduler 404(5) instead of a level 5 scheduler such as scheduler 404(10)), the queue fetch logic ignores the absent intermediate scheduler levels, for example during scheduling, enqueue and dequeue operations. Each of the levels of scheduling hierarchy might have one or more corresponding mapping tables in Queue Engine (QE) 308. By updating the one or more mapping tables of the scheduling hierarchy, MTM 300 might dynamically update the structure of scheduling hierarchy 400, for example by moving a scheduling node up or down in the hierarchy, adding a branch to the hierarchy, inserting new queues, or removing nodes with no queued tasks. Further, to modify the scheduling hierarchy, task data is not moved, rather unused schedulers are bypassed to move a queue to a higher scheduling level. Thus, the level in scheduling hierarchy 400 of the parent scheduler of a queue might be configured by a control processor of the network processor to achieve a certain desired scheduling rate.

In described embodiments, each scheduler other than root scheduler 402 might selectably employ any arbitration algorithm, for example a Smooth Deficit Weighted Round Robin (SDWRR) such as shown in FIG. 10, a Deficit Weighted Round Robin (DWRR) or strict priority arbitration between the queues and schedulers under it. For embodiments where schedulers other than root scheduler 402 employ SDWRR arbitration, some embodiments might employ two linked lists: one for active, and one for backlogged, child nodes. The child node at the head of the active list is selected for scheduling. If the child has exceeded the corresponding SDWRR arbitration limit, but is backlogged, the child is sent to the tail of the pending list. If the child has not exceeded the corresponding SDWRR arbitration limit (and is backlogged), the child is sent to the tail of the active list. If the child is no longer backlogged (either because the child is empty, or the child has exceeded its shaping limit), the child node is removed from both the active list and the backlogged list.

Figure 11:
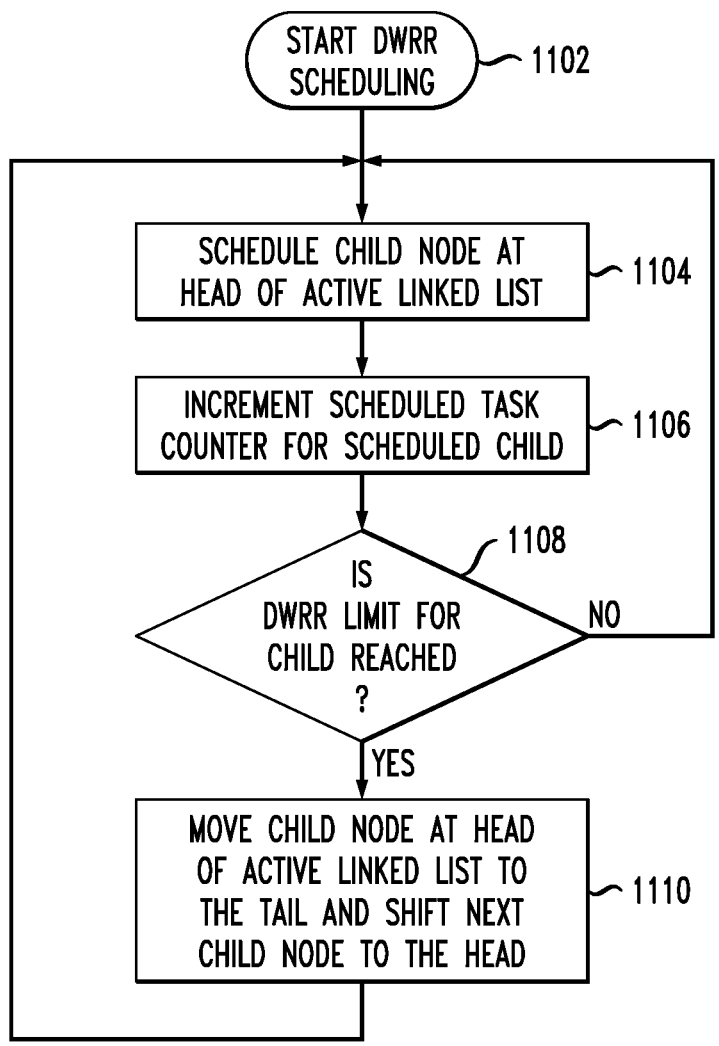
FIG. 11 shows a flow diagram of another exemplary round robin scheduling process of the traffic manager of FIG. 3, in accordance with embodiments of the present invention.

FIG. 11 shows a flow diagram of an exemplary DWRR scheduling algorithm. In DWRR mode, each scheduling node has a logical linked list of children under it. Each child has a DWRR limit associated with it. The scheduling node picks the head of the list as the winner each time. The node at the head of the list stays at the head until is has used up its DWRR limit or the node is either above its shaping rate or is empty. At step 1102, DWRR scheduling algorithm 1100 starts. At step 1104, the parent scheduler selects the child node at the head of the linked list for scheduling. At step 1106, the scheduled task counter is incremented for the selected child, and the incremented value is compared to the DWRR arbitration limit associated with the selected child. If, at step 1108, the incremented value has reached or exceeded the DWRR arbitration limit, then algorithm 1100 continues to step 1110, where the selected child node is moved to the tail end of the linked list, and the next child node in line becomes the head node. Processing then returns to step 1104, where the parent scheduler selects the child node at the head of the linked list for scheduling. At step 1108, if the incremented value has not reached or exceeded the DWRR arbitration limit, then algorithm 1100 returns to step 1104, where the parent scheduler selects the child node at the head of the linked list for scheduling.

Figure 12:
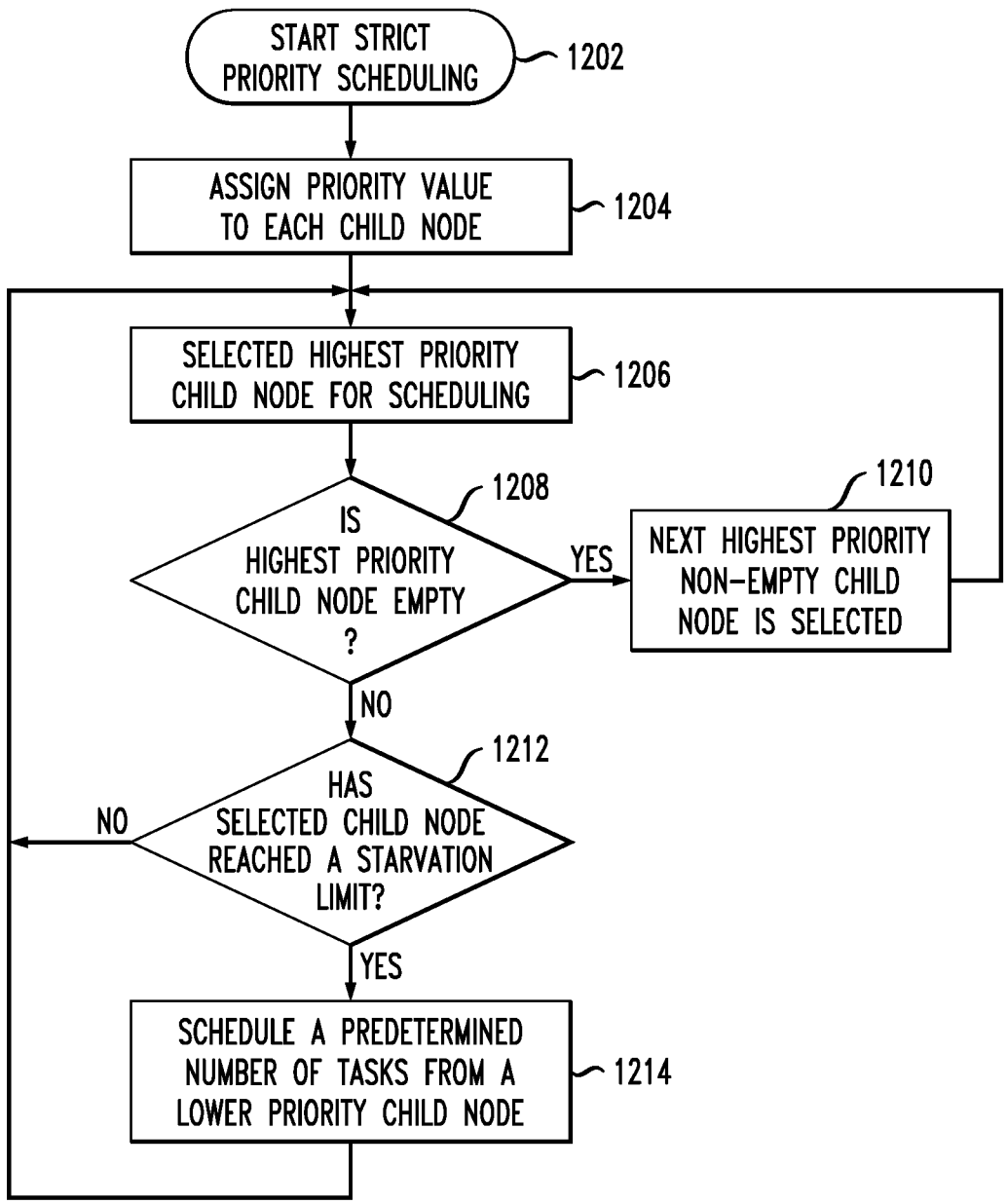
FIG. 12 shows a flow diagram of a strict priority scheduling method of the traffic manager of FIG. 3, in accordance with embodiments of the present invention.

FIG. 12 shows a flow diagram of an exemplary strict priority scheduling algorithm. In strict priority mode, each scheduling node might have a predetermined maximum number, M, of child nodes. In some embodiments, M might be equal to a maximum of four children. At step 1202, strict priority scheduling algorithm 1200 starts. At step 1204, the parent scheduler assigns each child node a priority value zero through M−1 (e.g., 0-3). At step 1206, the child with the highest priority with one or more tasks available for scheduling is chosen. At step 1208, if the highest priority child node becomes empty, at step 1210, the next highest priority child node with one or more tasks available for scheduling is chosen, and that child node is scheduled at step 1206. If, at step 1208, the highest priority child node is not empty, at step 1212, a test determines if the child node has reached a predetermined "starvation avoidance limit", and, if so, at step 1214 a predetermined number of tasks might be scheduled from a given lower priority child node, even though the higher priority child node was non-empty. This mechanism prevents one higher priority child node from completely starving scheduling of tasks from a lower priority child node. If, at step 1212, the test determines that the child node has not reached the predetermined starvation avoidance limit, strict priority scheduling algorithm 1200 returns to step 1206 to schedule tasks from the highest priority child node. In some embodiments, the starvation avoidance limit might selectively be turned on or off for a given node of scheduling hierarchy 400 by control software running on a processor of network processor 100.

In embodiments of the present invention, traffic shaping rates might selectably employ either a peak/sustained mode or a peak/minimum mode to enforce task scheduling traffic shaping of nodes of scheduling hierarchy 400. In the peak/sustained mode, each node might be assigned a corresponding peak rate and a corresponding sustained rate. In peak/minimum mode, each node might be assigned a corresponding peak rate and a corresponding minimum rate. In peak/sustained mode, if a traffic shaper of MTM 300 determines that a given node is scheduling tasks too fast, the traffic shaper might disallow the node from scheduling more tasks (e.g., by removing the child node from the corresponding parent's list for a predetermined time). In peak/minimum mode, if a given child node is scheduling tasks over the peak rate, the child node might be delayed from scheduling tasks for a predetermined amount of time. A separate calculation is performed based on the child's minimum rate that might allocate additional arbitration credits to the child at the rate of its minimum rate, such that the child is allowed to schedule tasks without going below a minimum rate.

Described embodiments provide a minimum rate guarantee for a node in scheduling hierarchy 400 employing a byte-based token bucket. When employing SDWRR or DWRR arbitration, the bandwidth available from the parent is distributed in the ratio of each child node's arbitration bucket weights. To guarantee a minimum rate at each child node, an amount of bandwidth might be reserved and then the remaining bandwidth might be distributed in the ratio of the bucket weights. The minimum rate guarantee for a given child node might be implemented by incrementing the child's arbitration token bucket by a determined amount at a rate corresponding to the guaranteed minimum rate. The amount that is added to the child's token bucket is determined by the computation: (time elapsed from last transmission)*desired minimum rate (expressed in bytes per time). By applying the compensation in bytes, the algorithm is independent of packet size that is being transmitted by network processor 100 corresponding to the various scheduled tasks to transmit whole packets that might be of arbitrary size.

Described embodiments account for differences in the scale of time and rate between the minimum rate and other rates implemented for the child, since the minimum rate might be much smaller than the child's peak rate. To account for varying rates, a credit to the arbitration bucket is performed in units of bytes and 8 bits of a byte fraction. In described embodiments, MTM 300 might typically support a 64 b time value that is available from a timer or clock of network processor 100 via timer and clock interface 320. Each increment of the clock might be called a "clock tick". In some embodiments, a 24 b subset ("scaled clock") of the 64 b time value might be selected to calculate timing for a given node of scheduling hierarchy 400. Which 24 b subsets are chosen is based on a scaling factor corresponding to the node, which might be set by control software of network processor 100. Each scheduling node might maintain a "last transmit time" value corresponding to a time value when the node was most recently scheduled by its parent scheduler.

To account for large variations between the minimum rate and the actual rate, some embodiments might also include an additional minimum rate scaling factor (8 b field) that might be employed to further scale time values used for minimum rate calculations. The desired guaranteed minimum rate might be set by control software of network processor 100 as a 16-bit field. For example, the 16-bit desired minimum rate value might correspond to the number of bytes that should be transmitted in 256 scaled time ticks, where the scaled time ticks is the elapsed time scaled according to the node's scaling factor and the additional minimum rate scaling factor.

Figure 13:
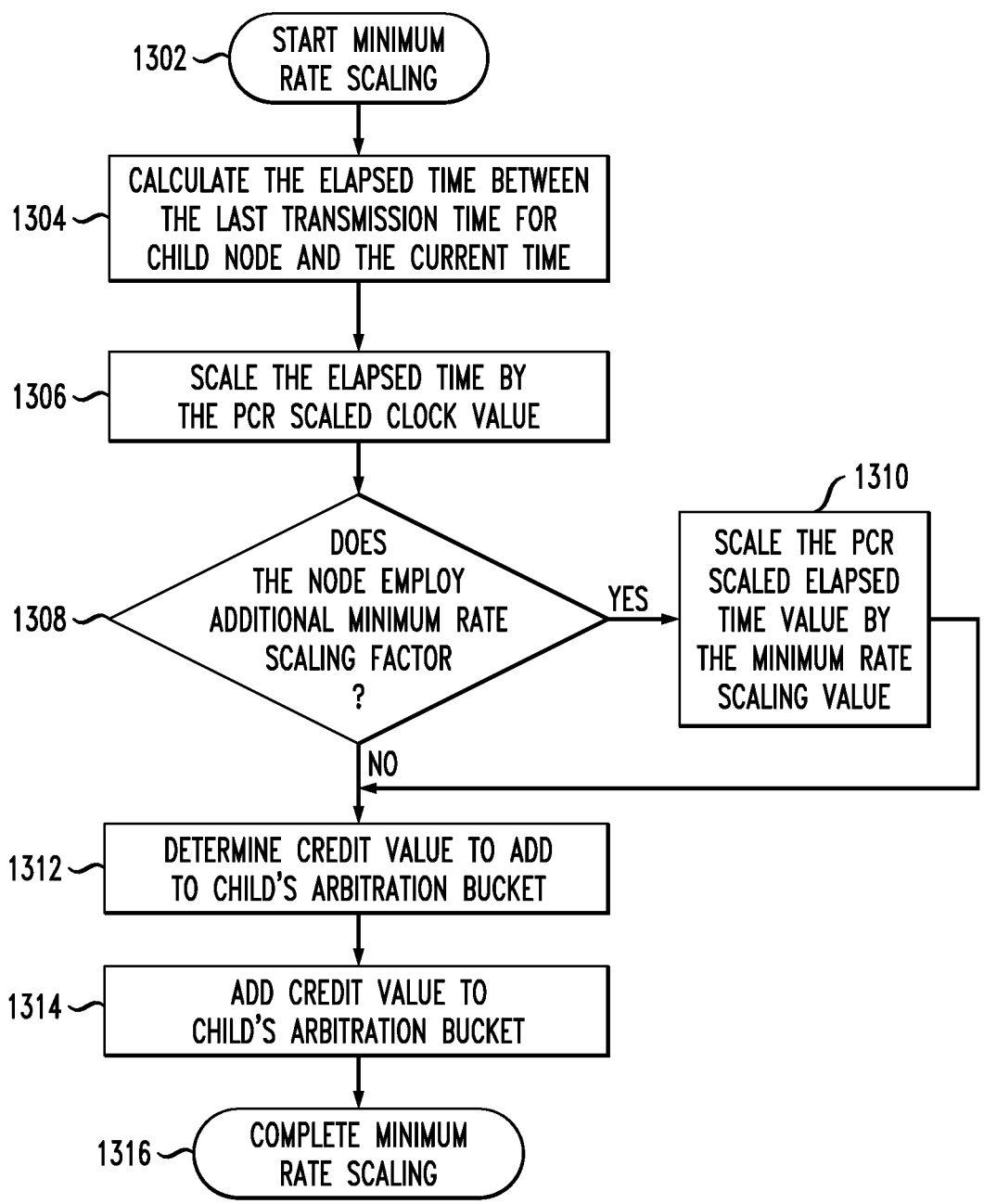
FIG. 13 shows a flow diagram of a minimum rate scaling method of the traffic manager of FIG. 3, in accordance with embodiments of the present invention.

FIG. 13 shows exemplary minimum rate scaling method 1300. Minimum rate scaling method 1300 starts at step 1302. At step 1304, the elapsed time ("delta time") between the last time value a task was scheduled from the node, and a current time value is determined by the scheduler. At step 1306, the determined elapsed time is scaled by the scaling factor (e.g., which 24 bits of the 64-bit clock value are chosen). At step 1308, if the child node employs the additional minimum rate scaling factor, then method 1300 proceeds to step 1310, where the additional minimum rate scaling factor is added to the scaled elapsed time value, and then method 1300 proceeds to step 1312. At step 1308, if the child node does not employ the additional minimum rate scaling factor, then method 1300 proceeds to step 1312. At step 1312, the credit value, in bytes and fractions of bytes, is determined that must be added to the child node's arbitration bucket value. At step 1314, the determined credit value is added to the child node's arbitration bucket. At step 1316, method 1300 ends.

In an exemplary embodiment, at steps 1304 and 1306, the elapsed time (delta time) is determined by the calculation: PCR delta time[31:0]=current timestamp[31:0]−last transmit time[31:0]. This calculates delta time in peak cell rate (PCR) time units. At steps 1310 and 1312, the credit value is determined by shifting the determined delta time by the minimum rate scaling factor: MCR delta time [23:0]=(PCR delta time>>min rate scaling factor)[23:0]+additional minimum rate delta time[7:0]. The additional minimum rate delta time value was stored based on a previous calculation (e.g., steps 1306 and 1310). This step shifts delta time to minimum cell rate (MCR) time units. Additionally, bucket value[31:0]=old bucket value[31:0]+(MCR delta time[23:8]*desired minimum rate[15:0])[31:0]. This step computes the arbitration bucket value in terms of bytes plus 8 bits of fraction. The fraction (lower 8 bits of the bucket value) and delta time fraction (lower 8 bits of the MCR delta time value) are stored in memory to use for a subsequent repetition of process 1300. The minimum rate (min rate) that is programmed is the number of bytes that can be transmitted in 256 scaled time units, where a scaled time unit is based on a minimum rate time scale.

Thus, described embodiments provide a method to guarantee a minimum rate for nodes in an arbitration mechanism of a packet-based network. Since the "credit" is calculated in bytes and added to a byte based token bucket, the scheduling node might still schedule a whole number of packets.

Described embodiments read task data for scheduled tasks from system memory 210. Task data might be of variable size. Described embodiments allow multiple threads of MTM 300 (e.g., tasks from multiple queues) to access system memory 210 to read the task data. Ordering is typically enforced on tasks from the same thread. Further, task data might be speculatively fetched from system memory 210 to provide higher throughput of MTM 300. As described herein, for each schedule operation, MTM 300 selects a queue to transmit one or more tasks (e.g., at step 616 of FIG. 6). To transmit the task, the corresponding task data is read from system memory 210. A task read operation reads the queue (e.g., one of queues 406) to determine a starting address of the task data in system memory 210. A memory read request for the starting address of the task data is sent to system memory 210. However, each queue 406 might track only the size of the first task in the queue.

The task read operation reads the task data for the task at the head of the scheduled task queue from system memory 210. As described herein, the queue contains the head pointer of the task queue in memory and contains the size of the task data of the task at the head of the queue. Task read operations might allow multiple threads (e.g., one queue per thread) to aggregate memory requests and sent multiple requests over one memory port to system memory 210. In some embodiments, task read operations might have up to 4 threads (4 queues) active at a time. The task data returned from system memory 210 could be out of order and is ordered through a re-order queue for each thread. Since a given queue structure might only know the size of the data for the task at the head of its queue, memory read requests might be issued speculatively, when possible, when the same queue sends multiple tasks back-to-back. Such a speculative read request avoids waiting for data corresponding to the first task to return from system memory 210 before knowing the size of the data for the task behind it. Described embodiments provide a task read operations with multiple threads with speculative read operations and ordering enforcement on returned data for each thread.

Speculative read operations provide the advantage of avoiding a wait for the read of data for the task at the head of the queue to finish being read from system memory 210 before learning the actual size of data for the next task in the queue. When data for more than one task is read from system memory 210, the second and subsequent tasks are read speculatively, since the actual size of the task data is not known. The amount of data that is fetched from system memory 210 by the speculative read operation might be configurable, and thus tuned for a given traffic pattern. If the size of task data fetched during a speculative read is greater than the actual task size, the excess data might be used for the next task in the same queue, or the excess data might be discarded.

Figure 14:
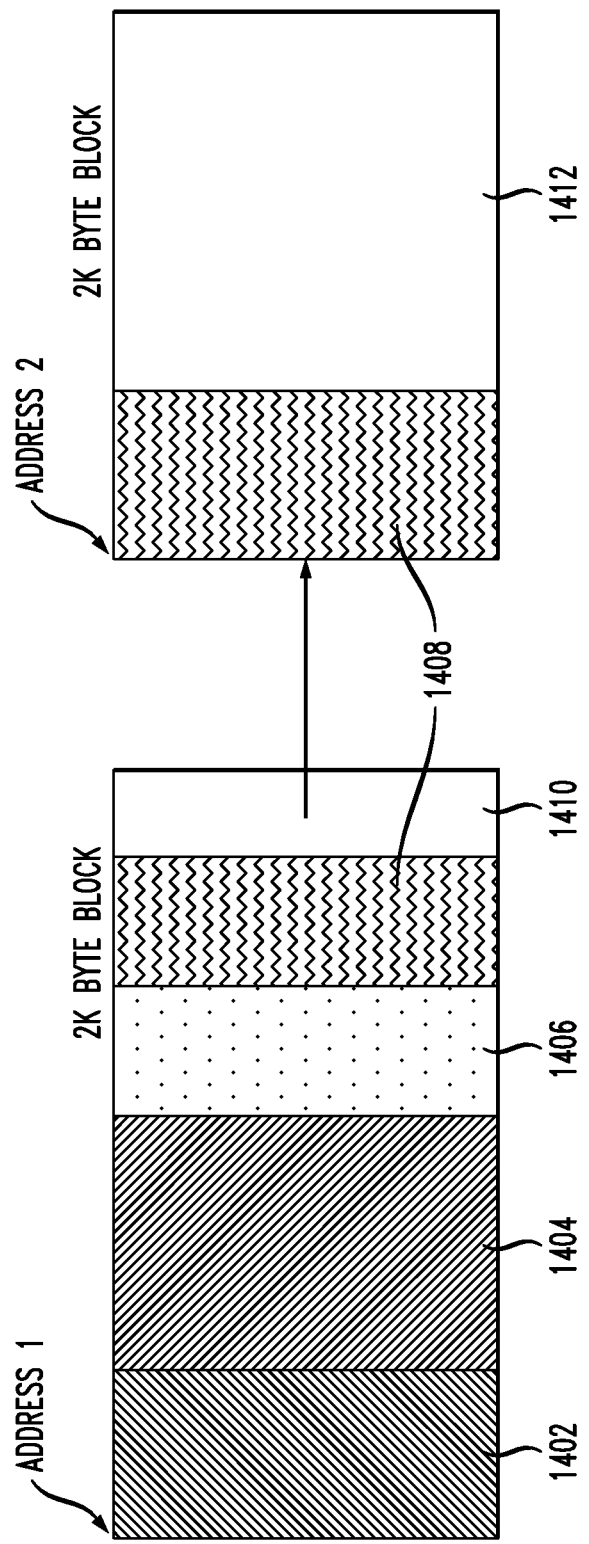
FIG. 14 shows a block diagram of an exemplary task queue structure of the traffic manager of FIG. 3, in accordance with embodiments of the present invention.

Task read operations update the head pointer of the queue after the read has been performed to point to the next task in the queue. Task read operations also update the task size field with the corresponding task data size of the new head of queue task. In some embodiments, tasks are stored in system memory 210, for example as shown in FIG. 14 described below. In some embodiments, the task stored in system memory 210 includes a header that includes the task size (in a first 16 B), task parameters, and the corresponding task data. The first dataword (16 B) of the task for a given task is read from system memory 210 when task data for a previous task in the same queue is read from system memory 210. The read task size value is employed to update the queue structure with an indicator corresponding to whether the size of the task data is larger than a predefined size (e.g., an indicator of a "large" task). In the event that the task is a "large task", only the large task is scheduled by the scheduler, and no speculative read operation for the subsequent task occurs.

Tasks might typically be stored in 2 KB blocks in system memory 210, and tasks might straddle 2 KB memory blocks. When a task straddles a memory block, the task data is parsed, and a next pointer field of the task is read, which is the last 16 B of the 2 KB block. This pointer is the location of the next memory read request. When all the read data comes back, the entire task becomes available. FIG. 14 shows a block diagram of an exemplary task queue structure. As shown in FIG. 14, data for a first task 1402 is stored in the queue, beginning at Address 1. Task data 1402 is followed by data for a second task 1404 and data for a third task 1406. Task 1406 is followed by data for a fourth task 1408. However, task data 1408 exceeds a memory boundary of the first memory block of queue 1400. In exemplary embodiments of the present invention, the memory boundary of each block is 2 kB. Thus, task data 1408 is appended with pointer data 1410, which provides a pointer to a next, linked, block of system memory 210 where the remainder of data for the fourth task 1408 is stored, starting at Address 2. Empty space 1412 in the second block is available for additional task data to be stored therein.

Figure 16:
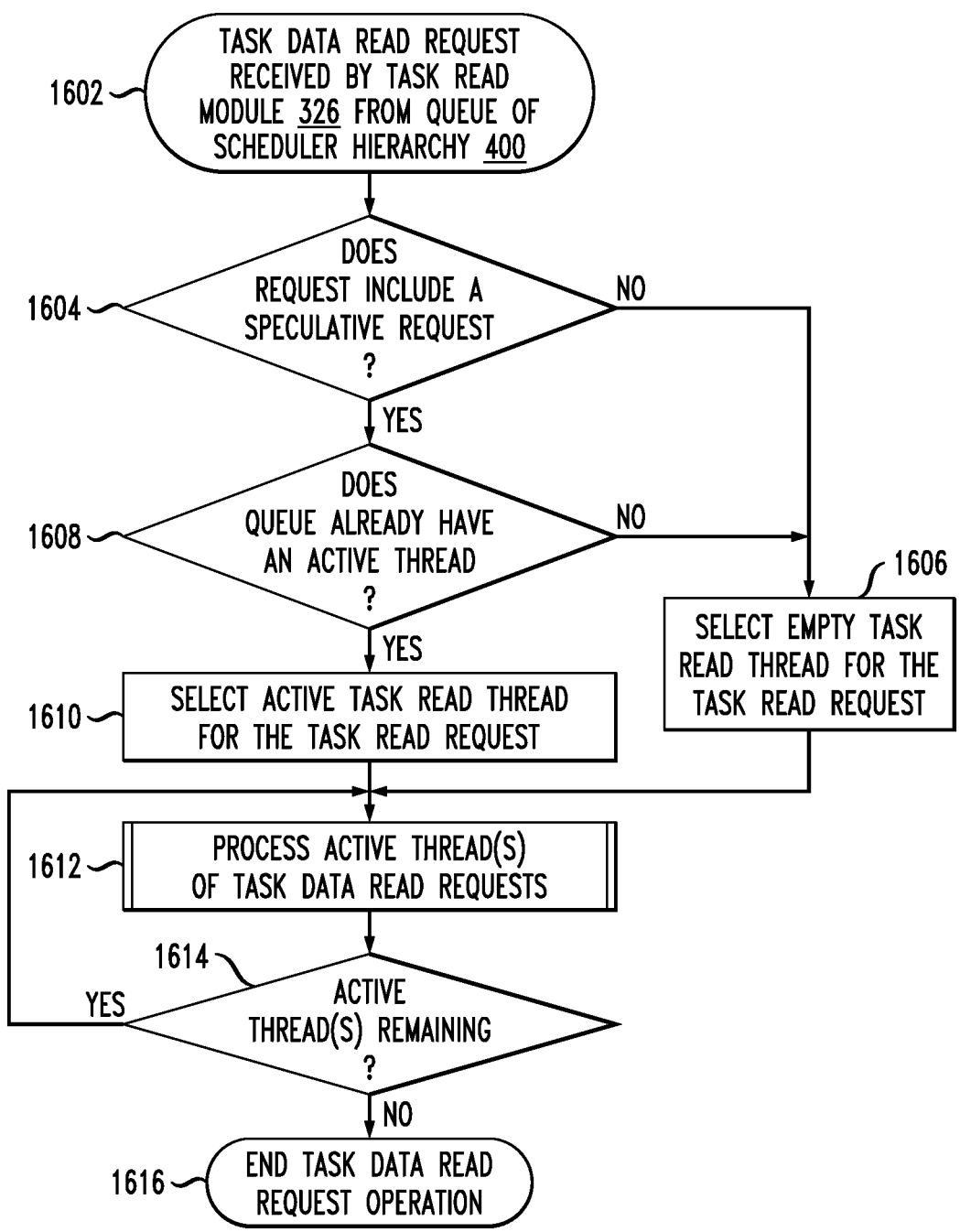
FIG. 16 shows a flow diagram of a multi-thread task data read request operation of the traffic manager of FIG. 3, in accordance with embodiments of the present invention.

FIG. 16 shows exemplary task data read operation 1600. At step 1602, a task data read operation is received by task read module 326 of MTM 300 to read task data from system memory 210 for a certain queue. At step 1604, if the received task data read request is non-speculative, then at step 1606, task read module 326 assigns an empty thread to process the task data read request such that no other active thread is accessing task data for the same queue. At step 1604, if the received task data read request is speculative (e.g., one or more back-to-back tasks scheduled from the same queue), then at step 1608, task read module 326 determines if an active thread exists for the queue. If, at step 1608, an active thread does not exist, at step 1606, task read module 326 assigns an empty thread to process the task data read request such that no other active thread is accessing task data for the same queue. If, at step 1608, an active thread does exist, at step 1610, task read module 326 assigns the task read request to the already active thread for the same queue. At step 1612, MTM 300 sends, via switch interface 314, read requests to system memory 210 to read task data for tasks in the request thread. The task data might be read into one of L1 caches 313 for a head and tail pointer of the task read thread. At step 1612, task read module 326 might also send a request to queue engine 308 to update one or more control data structure values corresponding to the queue, for example the head pointer of the queue, the head task size, etc. Queue engine 308 might also decrement the one or more read tasks from scheduling hierarchy 400. At step 1614, if any active threads remain, thread processing returns to step 1612. At step 1614, if no active threads remain, thread processing for task data read operations completes at step 1616. A thread is active until all the tasks for that thread are read from system memory 210.

Figure 17:
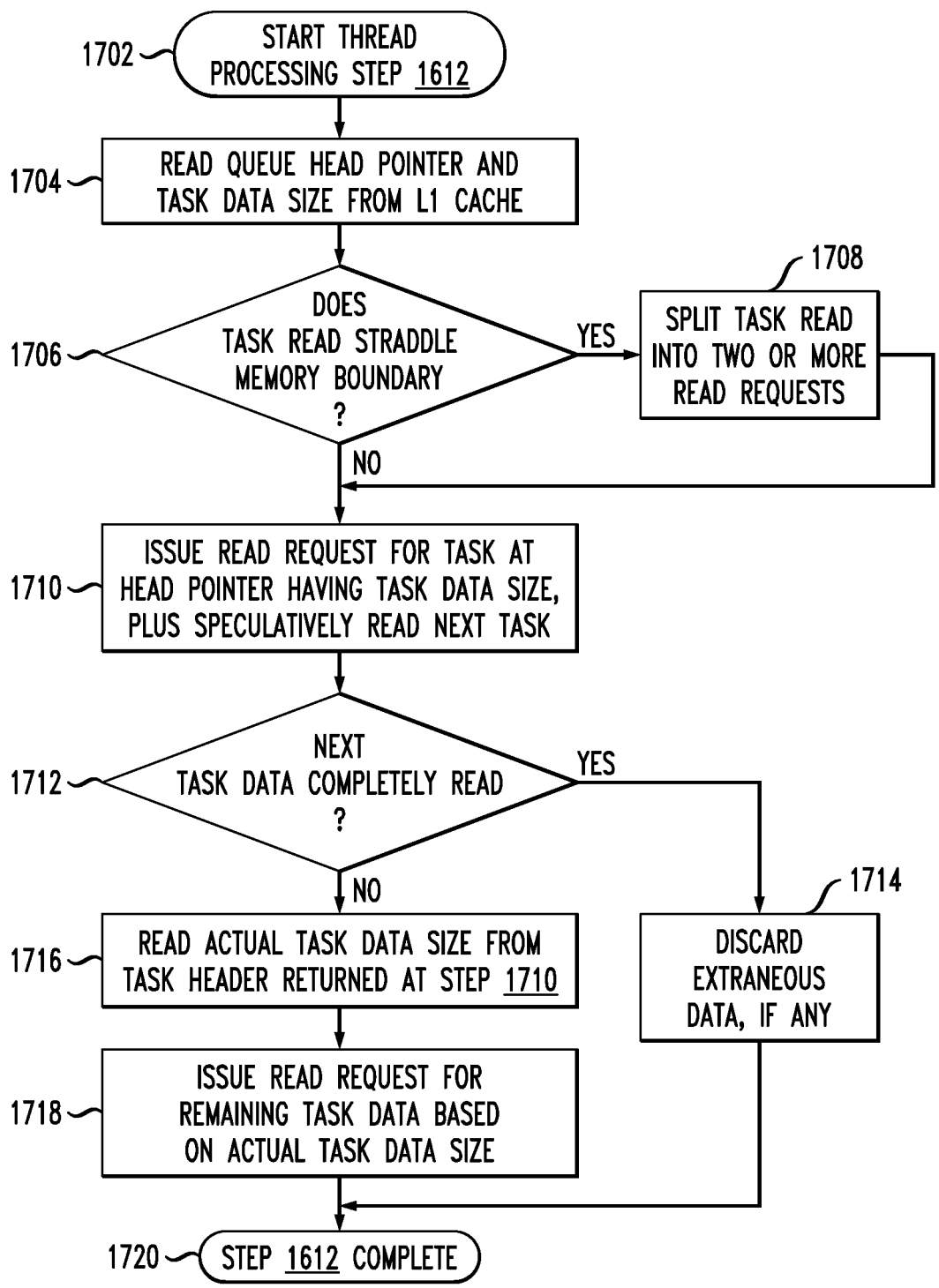
FIG. 17 shows a flow diagram of a thread processing method of the multi-thread task data read request operation of FIG. 16, in accordance with embodiments of the present invention.

FIG. 17 shows a flow diagram of thread processing method of step 1612 of FIG. 16. At step 1702, thread processing method 1612 starts. At step 1704, task read module 326 reads the queue head pointer and task data size for the head task from L1 cache 313. At step 1706, task read module 326 determines whether the task read request straddles a memory boundary of system memory 210 (e.g., a 2 kB boundary as described in regard to FIG. 14). If, at step 1706, the task read request straddles a memory boundary of system memory 210, then at step 1708, the read request is split into two or more read requests to read the task data from each memory block. After step 1708, or if, at step 1706, the task read request does not straddle a memory boundary of system memory 210, method 1612 proceeds to step 1710. At step 1710, task read module 326 issues a read request for the task stored at the location indicated by the head pointer, and having a length indicated by the task data size. At step 1710, task read module 326 might also issue a speculative read request for one or more subsequent tasks if one or more contiguous tasks for the same queue can be scheduled simultaneously. The speculative read request might read task data from the task location following the head pointer offset by the task data size, and might read data of a length equal to the default task data size for the corresponding scheduling node associated with the tasks. For example, task read module 326 might read the next N*16 B of task data from system memory 210.

At step 1712, if the speculative read operation returned the entire data for the speculatively read task(s), at step 1714, any extraneous data at the end of the speculatively read data is discarded, and at step 1720, process 1612 completes. Any left over scheduling credits (e.g., traffic shaping credits) might be used for a next speculative task read. At step 1712, if the speculative read operation did not return the entire data for the speculatively read task(s), at step 1716, the actual task data size for the speculatively read task is determined from the task header (e.g., the first 16 B of the task data). At step 1718, task read module 326 issues a read request for the remaining task data, where the read request is based on the actual task data size from the task header. At step 1720, step 1612 completes.

In described embodiments, for a speculative read request at step 1710, a read request of size N*16 B is issued for the task, where N is a configurable positive integer set by control software of network processor 100 (in some embodiments, N might default to 12). If there is any scheduling credit left from the previous speculative read, then a speculative read request for a subsequent task might be equal to (N*credit)*16 B. The speculative read computes the read address from the last read address and request size for that thread. If the speculative read data is more than the task, the remaining data might be discarded, or might be used for a next task. When a thread becomes empty, any left over data from speculative read operations might be discarded. Read data from system memory might be out of order and might be stored in a buffer for each thread such that the data might be re-ordered. Task read module 326 might select a thread to be read out in round robin fashion. As described herein, the queue structure contains the head pointer of the task queue in memory. The queue structure also contains the size of the task at the head of the queue. At step 1710, task read module 326 might update the head pointer of the queue after the read has been performed and update the task data size field that indicates the size of the task at the head of the queue. For this, the output task read block might read 16 extra bytes from memory to retrieve the header of the next task.

Described embodiments provide a method to drain packets from a part of a traffic manager scheduling hierarchy. The structure of scheduling hierarchy 400 might be altered when conditions in the network change. To alter the structure of scheduling hierarchy 400, MTM 300 might drain all the tasks associated with a queue, scheduler, or branch of scheduling hierarchy 400. When a scheduler is drained, the entire branch under the scheduler is drained of tasks. Described embodiments provide a method that: 1) stops enqueuing any tasks on the queues that are part of the hierarchy to be drained and waits to ensure all task enqueue operations on the part of the hierarchy to be drained are complete before starting the drain operation; 2) drains all tasks associated with a queue or scheduler (and the sub-tree underneath) in the hierarchy; 3) signals the end of steps (1) and (2) by generating an interrupt to a control processor of network processor 100; 4) recovers all the memory used by drained tasks when executing step (2); and 5) executes steps (1) and (2) without affecting the rest of scheduler hierarchy 400.

Figure 15:
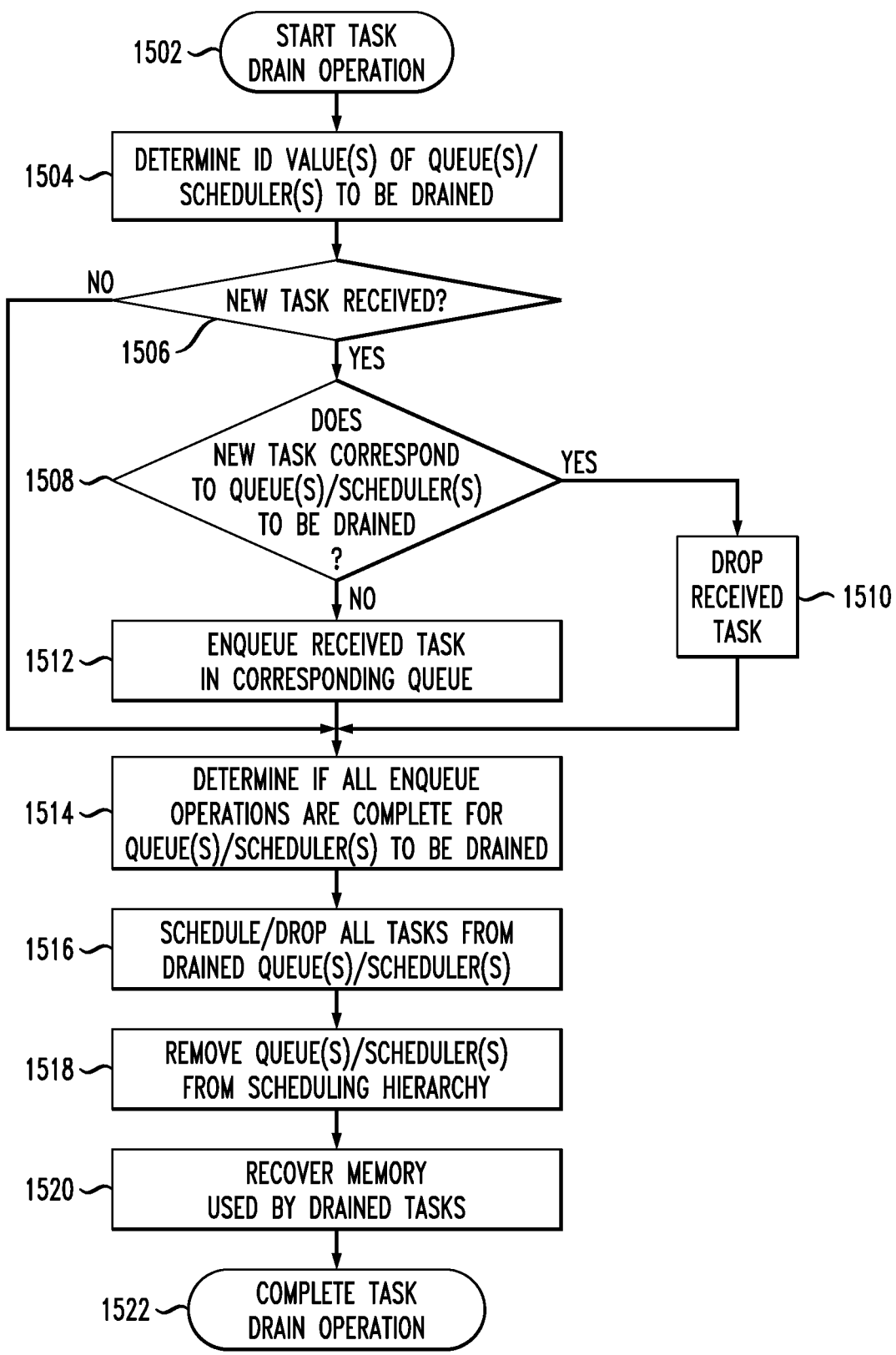
FIG. 15 shows a flow diagram of a task drain process of the traffic manager of FIG. 3, in accordance with embodiments of the present invention.

FIG. 15 shows a flow diagram of exemplary task drain operation 1500. At step 1502, task drain operation 1500 starts. When a queue or scheduler should be drained, at step 1504, the ID of the queue is programmed into a configuration register, for example in block 312 of MTM 300. At step 1506, if new tasks are received by MTM 300, the queue ID of the received task is compared to the queue/scheduler ID of the scheduling tree branch to be drained at step 1508. If, at step 1508, the received task has the same queue ID as the queue being drained, at step 1510 the received packet is marked to be dropped by buffer manager 302. Step 1508 might iteratively occur if one or more new tasks are received while a given scheduling tree branch is being drained. After step 1510, drain process 1500 proceeds to step 1514. Otherwise, at step 1508, if the received task does not have the same queue ID as the queue being drained, at step 1512 the received packet is enqueued in the corresponding queue, for example as described in regard to FIG. 7. After step 1512, drain process 1500 proceeds to step 1514. At step 1506, if no new tasks are received, drain process 1500 proceeds to step 1514. In some embodiments, steps 1506, 1508 and 1510 might occur in parallel with step 1514.

At step 1514, MTM 300 determines whether all task enqueue operations are complete for the queue or scheduler branch to be drained. In some embodiments, MTM 300 might determine whether the task enqueue operations are complete for all tasks for the queue to be drained by monitoring task counts of scheduling nodes at three stages of the enqueue process: (1) monitor task count when tasks are received by MTM 300 (e.g., step 602 of FIG. 6), which might be a count of tasks received; (2) monitor task count after buffer manager 302 has determined whether to accept or drop the received tasks (e.g., step 708 of FIG. 7), which might be a count of tasks accepted for enqueuing; and (3) at the end of the task enqueue operation (e.g., operation 606 of FIG. 7), which might be a count of tasks actually enqueued. For example, at step 1514, the count of tasks accepted and the count of tasks enqueued (e.g., task count (3)) are compared. When the count of tasks accepted becomes equal to the number of tasks enqueued, then the enqueue pipeline is clear of "to be drained" tasks. Task drain operation 1500 continues to step 151 6.

At step 1516, the queue or branch of scheduling hierarchy 400 to be drained is removed from scheduling hierarchy 400, and the tasks corresponding to the queue/branch are placed in a drain FIFO buffer of MTM 300. An indicator is set for a first drained task to indicate that a drain operation has been initiated ("first drain indicator"). A drain FSM inserts as many scheduling events into the pipeline of the given queue (and propagated up through scheduling hierarchy 400) as there are tasks in the drain FIFO. Each time the scheduling logic processes a drain packet, an indicator is set ("subsequent drain indicator"). The first task corresponding to the first drain indicator is scheduled normally at step 1516, although the memory and state indicators for the drained queue/branch are cleared up through scheduling hierarchy 400 at step 1518. Tasks corresponding to "subsequent drain indicators" are read from system memory 210 and dropped at step 1516. At step 1520, space used by drained tasks in system memory 210 is now available for reallocation. Task drain process 1522 completes at step 1522 once the drain FIFO is empty, the memory used in system memory 210 associated with the drained queue/branch is zero, or the linked list containing the children of the scheduler is empty.

In described embodiments, each node of scheduling hierarchy 400 maintains a scheduling data structure which includes various control data such as linked list pointers of the child nodes, statistics such as task count and memory used, characteristics such as the scheduling rate and scheduling algorithm, and various state indicators such as backpressure events and timer events. The state indicators might also include an indicator that a node is removed from the scheduling hierarchy (an "in-hierarchy indicator").

During scheduling, when a node with available tasks is selected by its parent for scheduling, the parent checks the various state indicators to determine whether the particular node might be scheduled (e.g., at step 614 of FIG. 6). Rules for scheduling might be as follows: 1) if a node is backpressured, the node cannot be scheduled and is removed from the scheduling hierarchy (e.g., the in-hierarchy indicator is cleared); 2) if the node is in a timer state, the node cannot be scheduled, but the node is not removed from the scheduling hierarchy (e.g., the in-hierarchy indicator is set); 3) if the node is neither backpressured nor in a timer state, the node can be scheduled (e.g., the "in-hierarchy" indicator is set). The in-hierarchy indicator is cleared when the task count for a node becomes zero and the node is removed from the linked list of active nodes, or when the node becomes backpressured. The in-hierarchy indicator is set for a scheduling node when (i) a task is enqueued and the node is not backpressured, or (ii) when the node is re-enqueued having a non-zero task count.

Any processing module in network processor 100 might generate a message directed for a particular node in scheduling hierarchy 400 to set or release the backpressure state. Described embodiments also allow any node at any level in the scheduling hierarchy to be controlled using backpressure (e.g., previously queues were the typical places where a backpressure might be applied). Since described embodiments provide the flexibility of a scheduler being backpressured, a partial tree from the scheduling hierarchy can be effectively backpressured and taken off-line for scheduling purposes.

Described embodiments provide a mechanism to dynamically control scheduling hierarchy 400 where one or more scheduling nodes have a backpressure or other timer event. A timer event is typically used to control the scheduling rates, for example to meet a traffic shaping constraint, and a backpressure event is usually caused by a resource availability constraint by a processing module of network processor 100 that receives tasks from MTM 300. When a scheduling node is subject to a backpressure or timer event, tasks from the corresponding scheduling node and its child nodes (if any) are prevented from being scheduled. When a scheduling node is released from a backpressure or timer event, tasks from the scheduling node and its child nodes (if any) become reavailable for scheduling (e.g., a re-enqueue operation as described in regard to FIG. 8).

Described embodiments provide that corresponding data structures for each scheduling node maintain one or more status indicators to represent the state of backpressure and timer events and whether the node is available for scheduling. When a node is subject to a backpressure or timer event, the node is removed from the parent scheduler's list of active nodes to schedule. Queue and scheduler levels are encoded in their respective IDs, which enables detecting and directing of incoming requests for backpressure and timer events for the target ID. Any processing module (e.g., one of µP cores 106 or hardware accelerators 108) of network processor 100 might request a backpressure event for a particular scheduling node, for example if the processing module cannot accept another task from that node.

A scheduler might create a timer event if the scheduling rate for a particular scheduling node exceeds the constraints imposed on its rate (e.g., at steps 806 to 812 of FIG. 8). The scheduler updates the timer indicator in the scheduling data structure of that node to indicate the node has a timer event. When the particular duration has elapsed, the timer sends a request to reset the timer bit. The backpressure release and the resetting of the timer bit have similar effect on the scheduling node—making the node available for scheduling within hierarchy 400.

When scheduler logic encounters a node having its timer indicator or backpressure indicator set, the scheduler takes the node out of the scheduling hierarchy and sends a "response" message to its parent to remove this node from its parent's list of active nodes for scheduling. Thus, this node is no longer available for scheduling until a re-enqueue operation occurs (e.g., step 812).

Figure 18:
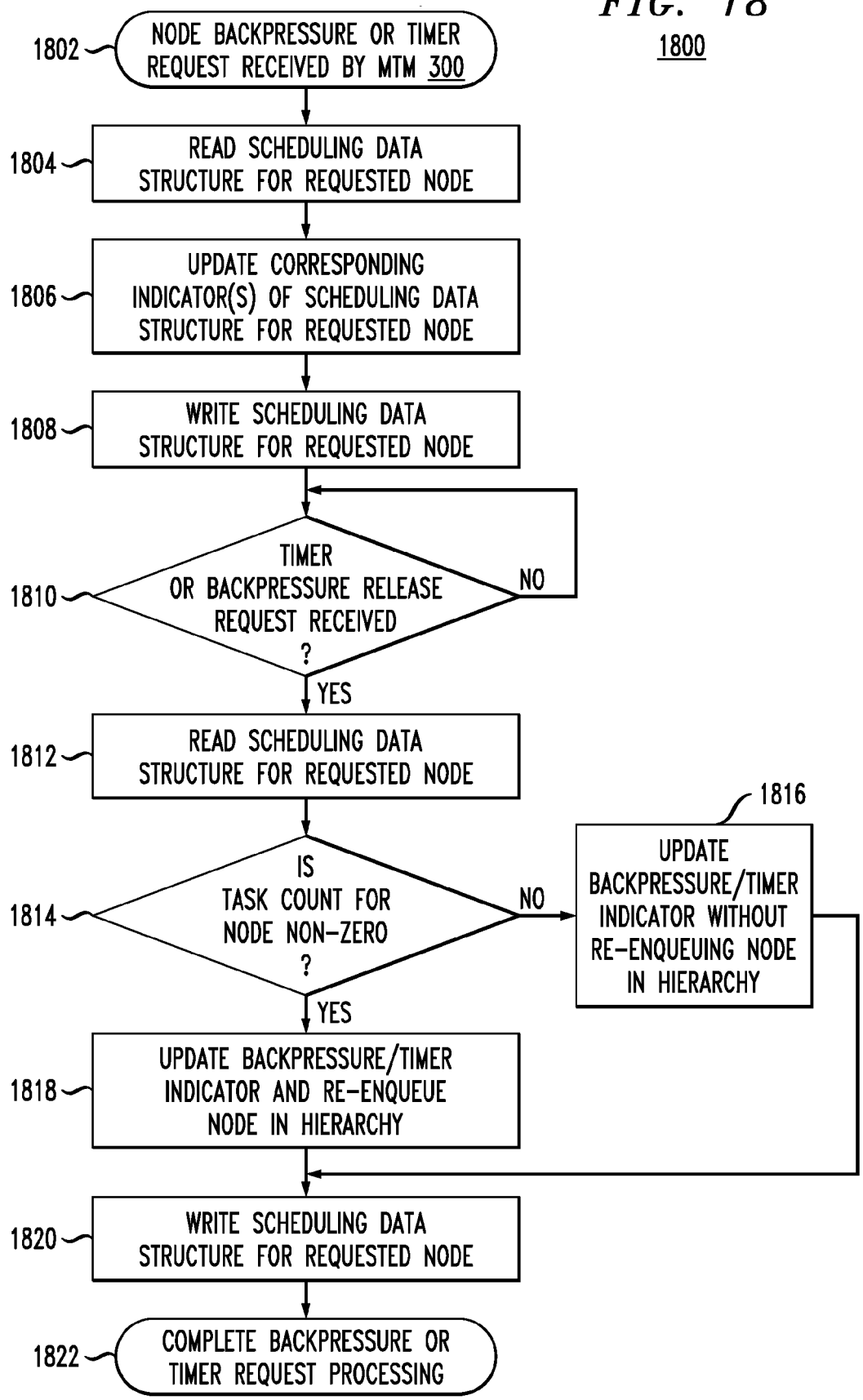
FIG. 18 shows a flow diagram of a backpressure or timer request process of the traffic manager of FIG. 3, in accordance with embodiments of the present invention.

FIG. 18 shows a flow diagram of exemplary backpressure or timer request process 1800. At step 1802, a backpressure request or a timer request is received by MTM 300 from a processing module of network processor 100 for a given scheduling node of hierarchy 400. At step 1804, the scheduling data structure for the target scheduling node is read from one of system memory 210 to one of L1 caches 313. At step 1806, the corresponding backpressure or timer status indicator is updated to reflect to the received request, and, if necessary, the in-hierarchy status indicator is updated to reflect that the node is removed from scheduling hierarchy 400. At step 1808, the updated scheduling data structure is written back to system memory 210.

At step 1810, once a backpressure release request or a timer release request is received by MTM 300 corresponding to the backpressure request or timer request received at step 1802, processing continues to step 1812. At step 1812, the scheduling data structure for the target scheduling node is read from one of system memory 210 to one of L1 caches 313. At step 1814, if the task count for the node is non-zero, then at step 1818, the corresponding backpressure and timer indicators are updated, and the node is re-enqueued in scheduling hierarchy 400, for example by updating the in-hierarchy status indicator. At step 1820, the updated scheduling data structure is written to system memory 210. At step 1822, backpressure and timer request process 1800 completes.

If, at step 1814, the node has a task count equal to zero, at step 1816, the corresponding backpressure and timer indicators are updated, but the node is not necessarily re-enqueued in scheduling hierarchy 400 until one or more tasks are enqueued in the node. At step 1820, the updated scheduling data structure is written to system memory 210. At step 1822, backpressure and timer request process 1800 completes. Process 1800 might be repeated at each parent level of scheduling hierarchy 400 above the requested node, such that task counts and status indicators at each parent level are updated accordingly to the received backpressure or timer request.

Thus, as described herein, embodiments of the present invention provide dynamic control of specific nodes in scheduling hierarchy 400 using backpressure and timer indicators. Nodes are removed from scheduling hierarchy 400 when backpressured or in a timer event, and nodes are added back in to scheduling hierarchy 400 when the backpressure or timer event is complete. A node at any level in scheduling hierarchy 400 might be controlled by the backpressure and timer events, and might be either a queue or a scheduler.

As described herein, in embodiments of scheduling hierarchy 400, each level in hierarchy requires the processing of enqueue and dequeue operations. State machines for the enqueue and dequeue operations might require exclusive accesses to one or more data structures of scheduling hierarchy 400 (e.g., the scheduling data structures) while still allowing read and write accesses to other data structures of scheduling hierarchy 400. As described, each node of scheduling hierarchy 400 generally interacts directly only with its parent node and child node(s). Changing the structure of scheduling hierarchy 400 (e.g., removing a branch or scheduling level, etc.) potentially requires updating multiple parent and child levels of scheduling hierarchy 400.

Scheduling hierarchy 400 includes one or more finite state machines (FSMs), for example in scheduler 310, to perform enqueue, dequeue, re-enqueue and scheduling operations. Each FSM typically might require exclusive access to the queue or scheduler data structure being processed. One or more entries in the corresponding scheduling data structures might be reserved for updates by the FSMs. Some entries might be exclusive to a given FSM, while others are shared among two or more FSMs. Further, to update its own reserved entries, an FSM might copy whole data structures without another FSM updating other bytes of that data structure in parallel. Apart from the FSMs, other accesses to these data structures are non-blocking. For the FSMs, the priority to access data structures, as well as interactions with parent and child node updates is defined to avoid architectural deadlock. The order of execution among various FSMs and functions enables fast hardware implementations of the scheduling FSMs.

As described herein, an enqueue FSM might perform a task enqueue operation (e.g., as shown in FIG. 7). The task enqueue operation might occur at multiple levels of scheduling hierarchy 400 for any given task. The queue for the task is fetched from system memory along with all parents up to the root scheduler (e.g., step 704). Active and pending lists are updated based on the node characteristics (e.g., step 708). Statistics such as task count and used memory are updated (e.g., step 710). The updated task count is sent to the parent scheduler (e.g., step 710).

A dequeue FSM might perform a task dequeue operation (e.g., as shown in FIG. 9). When one or more tasks are available at the root scheduler, the scheduler schedules one or more tasks from one of its children (e.g., step 616 of FIG. 6). A message is sent to the child (a scheduler or a queue) about the tasks being scheduled from that child (e.g., step 904 of FIG. 9). The child responds to the schedule message indicating whether it accepted the schedule (e.g., step 906). Based on the child's response, the scheduler updates its own task count for that child (e.g., step 908). Further, in case the constraints such as the shaping rates for this scheduler dictates, this scheduler could be made to wait for certain time duration (e.g., steps 806 through 812 of FIG. 8). The scheduling cycle might repeat at each scheduler level for subsequent tasks. Additionally, upon receiving a schedule message from its parent (as at step 904), the child node might start its own scheduling cycle such as shown in FIG. 9. The queue node determines the actual number of tasks being scheduled and propagates the corrected task count (e.g., at step 912) through scheduling hierarchy 400.

As described, re-enqueue operations might occur when a given node exceeds its scheduling rate, and the node is temporarily removed from scheduling hierarchy 400 for a computed time duration. After serving this duration, the node is added back to scheduling hierarchy 400 via a re-enqueue operation. This operation is similar to the enqueue operation except that, the number of tasks added back to the parent is the total number available at this node, and there is no new memory usage added to scheduling hierarchy 400.

A link operation occurs whenever an enqueue or dequeue operation is performed at a scheduler which adds to the tail of the linked list of active child nodes. The tail scheduler or queue receives a link message and updates its next pointer to the new tail. The parent waits for the completion message to go forward with the remaining part of its enqueue or dequeue operation.

In described embodiments, there is an L1 cache module (e.g., one of L1 caches 313) for each scheduler level (other than root scheduler 402) and one for the queue level of scheduling hierarchy 400. The enqueue FSM allocates the queue in the queue L1 cache at the start of the enqueue process. The enqueue operation starts at the queue level, and progressively works its way through the levels of scheduling hierarchy up to the root scheduler. The dequeue operation starts at the root scheduler and works its way through the scheduling hierarchy to the queue level (and eventually to the task). Based on the level of the parent of the queue, the scheduler's from parent level onwards is allocated by modules per level. Upon completion of enqueue operations, these entries in the L1 cache are de-allocated per level. The dequeue operation is similar to enqueue, with the difference being that it allocates the scheduler per level, starting from the first level of schedulers below root scheduler 402, proceeding to the queue level. After the end of a dequeue operation, all entries in the L1 cache are deallocated per level.

The re-enqueue operation starts at the level the particular node is in the scheduling hierarchy and progressively reaches root scheduler 402. The link operation is initiated by a scheduler level and competed either by its child scheduler at immediately lower than itself or by its child queue. Thus, each level might have one or more FSMs working for each of these operations simultaneously. An exemplary interaction for these operations for scheduling data structure accesses is as follows:

a. An FSM reserves the scheduling data structure for its exclusive modifications. An FSM works only on the bytes/cache lines reserved for it, or shared for update among two or more FSMs.
  b. Scheduler access to the scheduling data structure to prepare a schedule has the highest priority.
  c. Dequeue operations to update the task count and list pointers is the next highest priority, because it schedules tasks for transmission, thereby reducing the tasks in MTM 300 by delivering them to their destination.
  d. A re-enqueue operation adds back an existing node to scheduling hierarchy 400, and gets a higher preference than an enqueue operation.
  e. The enqueue brings a fresh packet into MTM 300 and hence is the lowest priority for processing a scheduling data structure over operations for tasks that have already been received.
  f. A link operation has exclusive access to its field in any data structure. Further, the only other time this field is modified (by an enqueue) is for the first enqueue operation for this structure. So, the link operation does not need an explicit priority.
  g. Propagation of messages occurs throughout scheduling hierarchy 400 for a task dequeue operation, a task enqueue operation and a re-enqueue operation. For each operation requiring a propagation of the output to the parent or the child level enters the arbitration for data structures based on the availability of space at the output.

Thus, described embodiments provide a modularized and distributed hardware implementation of a high performance scheduler. A modularized implementation also provides flexibility in adding or subtracting a particular level (target level) in the scheduling hierarchy by simple connections between respective parent and child levels of the target level. This addition or subtraction might be done in hardware or software.

During enqueue and dequeue operations, the various FSMs might access one or more data structures stored in L1 caches 313, each data structure corresponding to a given queue or scheduler. Each data structure might have one or more data fields, where each data field might be reserved for modification by less than all of the FSMs, or might be generally available to all the FSMs. Therefore, embodiments of the present invention provide a method for allowing read-only write access or locked/mutually exclusive (mutex) access to one or more data fields of the data structures. Thus, flexible access to the data structures from one or more threads might be provided, while also maintaining data coherency across multiple operations.

As described herein, enqueue and re-enqueue operations (e.g., FIG. 7), add one or more tasks to scheduling hierarchy 400, either when a task is received by MTM 300 (enqueue operation) or when a given scheduling node satisfies scheduling/shaping constraints and is made available for scheduling by MTM 300 (re-enqueue operation). Upon either an enqueue or re-enqueue operation, the various control and status data structures of each queue and each corresponding parent scheduler up to root scheduler 402 are updated, for example to reflect an updated task count, amount of memory used, head and tail pointers of the data structures, and so on (e.g., at steps 708 and 710 of FIG. 7). Further, as described herein, a dequeue operation (e.g., FIG. 9) removes one or more tasks from scheduling hierarchy 400 when tasks are scheduled for transmission by MTM 300. As described, in a dequeue operation, a parent scheduler selects a child node for scheduling based upon one or more corresponding data structures of the parent scheduler. The selected child node responds to the parent scheduler, and the parent scheduler updates the various data structures (e.g., task counts and list pointers at step 908). The process iteratively repeats at each level of scheduling hierarchy down to a selected queue node.

Other than enqueue, re-enqueue and dequeue operations, other FSMs of MTM 300 might access the various status and control data structure of the various nodes of scheduling hierarchy 400. For example, the amount of memory used by various tasks of a node might change during operation of MTM 300, or memory might be released from use at some time after a task has been dequeued, and a message to update the memory used might be propagated through scheduling hierarchy 400 as a background operation in addition to the regular scheduling operations. Additionally, one or more operations, such as buffer management and traffic shaping, might access various data fields from the control and status data structures. Lastly, during operation of MTM 300, various pointers corresponding to the memory blocks used by the corresponding task data might be updated, for example to indicate a new memory block is added to store task data (e.g., pointer data 1410 of FIG. 14).

As described herein, the various control and status data structures of scheduling hierarchy 400 are stored in L1 caches 313. Queue engine 308 requests the data structures from L1 caches 313 on an as-needed basis. As described herein, data stored in system memory 210 might be stored in L1 caches 313 during processing. Described embodiments might provide four types of access for queue engine 308 to L1 caches 313: (1) simple read access, (2) simple write access, (3) locked read access, and (4) locked write access. Simple read access requests and simple write access requests are processed regardless of the status of a lock being placed on the requested data structure. Thus, a simple read access or a simple write access might correspond to data fields that modified by only one thread of MTM 300, since there would be no need to lock the data structure. A locked read access or a locked write access occurs only when the requested data structure is unlocked. The locked request updates a lock status of the data structure to provide exclusive access to data fields that might be modified by more than one thread of MTM 300, thus a need might exist to maintain data coherency between one or more thread operations of MTM 300.

In described embodiments, a lock of a data structure might vary in time from one cycle to typically multiple cycles of the network processor depending upon the nature of the locked access request. Similarly, a time gap between accesses to a lock from the same FSM, thread, or module of MTM 300 might be enforced as a configurable number of 0-M cycles of the network processor, where M is a positive integer.

Embodiments of the present invention provide two access arbiters (e.g., as part of queue engine 308 of FIG. 3) between MTM 300 and L1 caches 313, for example at each port of L1 caches 313 (e.g., a read port and a write port of the memory). A first arbiter might arbitrate between simple access requests from the various threads and modules of MTM 300. A second arbiter might be an "address mutex arbiter" that arbitrates between locked access requests from the various threads and modules of MTM 300 that require exclusive access to L1 caches 313. The simple arbiter might be implemented as any type of arbiter, for example, a fixed priority or round robin arbiter.

Figure 19:
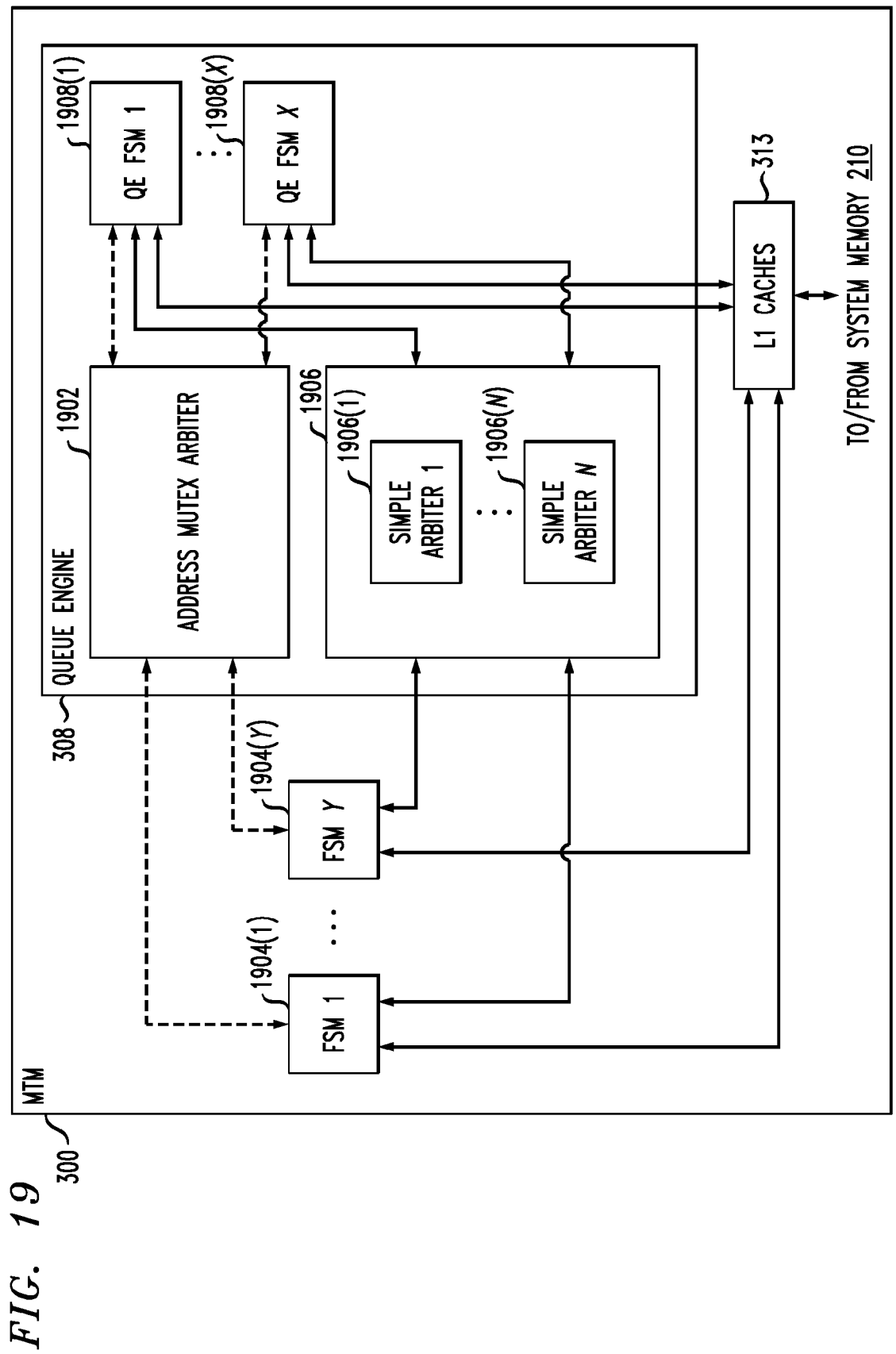
FIG. 19 shows a logical block diagram of a queue engine of the traffic manager of FIG. 3, in accordance with embodiments of the present invention.

FIG. 19 shows an exemplary logical block diagram of the simple and address mutex arbiters of queue engine 308. As shown in FIG. 19, queue engine 308 might include address mutex arbiter 1902 and simple arbiter 1906. In some embodiments, simple arbiter 1906 might include one or more simple arbiters, shown as simple arbiters 1906(1)-1906(N). In embodiments having multiple simple arbiters, each simple arbiter 1906(1)-1906(N) might be dedicated to arbitrate simple access requests of a given type, for example, each of read requests, write requests, memory allocation requests, and L1 cache requests might have a corresponding simple arbiter 1906(1)-1906(4). As shown in FIG. 19, MTM 300 might include one or more finite state machines (FSMs) 1904(1)-1904(Y) that might request access to data stored in system memory 210. Similarly, queue engine (QE) 308 might include one or more QE FSMs 1908(1)-1908(X) that might request access to data stored in system memory 210. As shown, each of FSMs 1904(1)-1904(Y) and QE FSMs 1908(1)-1908(X) are in communication with simple arbiter 1906 (or a corresponding one of simple arbiters 1906(1)-1906(M), and L1 caches 313. Each of FSMs 1904(1)-1904(Y) and QE FSMs 1908(1)-1908(X) might optionally be in communication with address mutex arbiter 1902, as indicated by the dashed lines. For example, only corresponding ones of FSMs 1904(1)-1904(Y) and QE FSMs 1908(1)-1908(X) that require coherent data accesses might be in communication with address mutex arbiter 1902.

Address mutex arbiter 1902 might receive locked access requests from each source of MTM 300 that requires exclusive memory access (e.g., corresponding ones of FSMs 1904(1)-1904(Y) and QE FSMs 1908(1)-1908(X)). Each request might include the memory address requested and a priority field for indicating a priority level of the access request. FIG. 20 shows exemplary address mutex arbitration method 2000. At step 2002, address mutex arbiter 1902 receives one or more locked access requests to L1 caches 313 from one or more modules of MTM 300. At step 2004, the memory address corresponding to each of the one or more received access requests is determined. At step 2006, address mutex arbiter 1902 determines if the received requests are for the same address simultaneously. If the received requests are for unique addresses, then, at step 2012, address mutex arbiter 1902 determines whether any of the one or more received requests are for an address already locked out by a previous access request. For example, address mutex arbiter 1902 might maintain a dynamic table of locked addresses. If, at step 2006, multiple of the one or more received access requests are for the same address, then, at step 2008, address mutex arbiter 1902 might allow access to any request for a unique address, and the received request having the highest priority value for the conflicting address. The one or more lower priority access requests for the conflicting address might be queued at step 2010. Process 2000 might then proceed to step 2012 to determine whether any of the received requests for unique addresses are for an address already locked out by a previous access request.

At step 2012, address mutex arbiter 1902 determines if any of the received requests for unique addresses are locked out by a prior access request, for example if one or more of the requested addresses are indicated as locked in the locked address table. If, at step 2012, one or more of the requested addresses are locked, at step 2014, the one or more access requests for one or more locked addresses might be queued. Process 2000 then proceeds to step 2016. If, at step 2012, none of the requested addresses are locked, process 2000 proceeds to step 2016. At step 2016, address mutex arbiter 1902 grants access to the one or more requested addresses of L1 caches 313 corresponding to the one or more requests that are not locked out by prior accesses. At step 2020, process 2000 completes. In some embodiments, the tests of steps 2006 and 2012 might occur in any order, or might occur substantially simultaneously.

In embodiments of the present invention, a lock grant (e.g., as granted at step 2016) is maintained either for a predetermined number of cycles of network processor 100, or might be unlocked when a release signal is received from the requestor. Thus, a lock grant might stay locked for one or more cycles of the network processor. FIG. 21 shows an exemplary flow diagram of lock release process 2100. At step 2102, the address mutex arbiter receives a release request from a corresponding thread or module of MTM 300, or address mutex arbiter 1902 receives a timer event, for example from timers and clocks interface 320, indicating that the associated predetermined number of cycles has elapsed. At step 2104, address mutex arbiter 1902 releases the lock on the one or more addresses corresponding to the release request. At step 2106, address mutex arbiter 1902 determines if one or more lower priority or locked out requests are queued for the one or more released addresses. If one or more requests are queued, at step 2108, address mutex arbiter 1902 determines whether one or more of the queued requests are consecutive requests for the same address from the same source requestor.

If, at step 2108, one or more of the queued requests are consecutive requests for the same address from the same source requestor, at step 2109, address mutex arbiter 1902 determines whether one or more lower priority requests are queued for the address. If, at step 2109, one or more lower priority requests are queued, at step 2110, address mutex arbiter 1902 disallows access by the consecutive request for each address, and grants access to a lower priority request for the address thus allowing a lower priority requestor to have a request processed after a release by the higher priority requestor, and preventing low priority requests from being locked out by high priority requests. After step 2110, process 2100 proceeds to step 2114. If, at step 2109, no lower priority requests are queued, at step 2111, address mutex arbiter 1902 allows access by the consecutive request for each address. If, at step 2108, none of the queued requests are consecutive requests for the same address from the same source requestor, at step 2112, the address mutex arbiter grants access for the one or more queued requests, for example by process 2000 as shown in FIG. 20. At step 2114, the address mutex arbiter updates the locked address table corresponding to the one or more addresses having queued requests that are now active, and process 2100 proceeds to step 2116. If there are no requests queued, lock release process 2100 completes at step 2116.

Thus, as described, embodiments of the present invention provide that simple read or write operations are granted access to L1 caches 313 by a simple arbitration process, such as strict priority or round robin, and one or more simple requests might be active for a given address simultaneously. Locked requests that enforce coherency might be granted access to L1 caches 313 based on the address of the request, followed by priority level for access requests to the same address, and then by history such that consecutive requests to the same address by the same requestor do not prevent access by a lower priority request. Multiple requests for unique addresses are processed simultaneously in parallel execution on one or more data structures in L1 caches 313, thus improving memory throughput, while also maintaining data coherency.

As described herein, referring to FIG. 5, each task 500 might include a shared parameter ID 508 that points to a shared parameter entry stored in a shared parameter data structure in system memory 210. In some embodiments, the shared parameter entry might be 32 bytes. Tasks mapped to different queues at any level might have the same shared parameter ID to enable data sharing among the various tasks. In addition, the shared parameter data structure might be optionally associated with a queue, providing additional parameters for the queue. In some embodiments, a separate L1 cache 313 might be employed to store the shared parameter data for queues that are being worked on by MTM 300. Described embodiments provide flexible data sharing among various queues of scheduler 400 through shared parameters. Shared parameters provide an ability to share data between any queues or any set of tasks mapped to same or different queues. The shared parameter ID might be assigned either per-task, or per-queue. For example, a shared parameter ID might be selected based on either a task (e.g., shared parameter ID 508) or the queue ID (e.g., the queue of scheduling hierarchy 400 associated with the task).

Shared parameters are loaded into buffer manager 302 during a task enqueue operation (e.g., at step 704 as shown in FIG. 7). During dequeue operations (e.g., at step 914 as shown in FIG. 9), the shared parameter data might be employed to affect traffic shaping or to maintain statistics in the shared parameter data. The shared parameter data might be employed to affect a task discard decision or to maintain task or queue statistics in the shared parameter data block. As described, a shared parameter ID for a task is selected either from the task itself or from the queue. If the task has valid a shared parameter value in field 508, then that shared parameter ID is selected, otherwise the shared parameter ID in the queue structure is selected, if valid. A predetermined parameter ID value might be employed as an "invalid indicator" (e.g., a shared parameter value of 0xFFFFFF). In some embodiments, the shared parameter ID value might be a 24-bit value where the upper 4-bits index to one of 16 memory-mapping tables (software configurable). Each memory-mapping table converts the lower 20-bits of the ID to a physical memory address where that shared parameter data is stored (32 Bytes) in system memory 210. The shared parameter data is fetched from system memory 210 along with the task data and queue and scheduler control data.

Thus, as described herein, embodiments of the present invention provide for dynamically constructing a scheduling hierarchy of a network processor. A traffic manager generates a tree scheduling hierarchy having a root scheduler and N scheduler levels. The network processor generates tasks corresponding to received packets. The traffic manager queues the received task in the associated queue, the queue having a corresponding parent scheduler at each of one or more next levels of the scheduling hierarchy up to the root scheduler. A parent scheduler selects, starting at the root scheduler and iteratively repeating at each of the corresponding N scheduling levels until a queue is selected, a child node to transmit at least one task. The traffic manager forms output packets for transmission based on the at least one task from the selected queue.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of dynamically constructing a scheduling hierarchy of a network processor having a plurality of processing modules and at least one shared memory with packet data, the method comprising:

generating, by the network processor, one or more tasks corresponding to each of a plurality of received packets associated with one or more data flows;

receiving, by a traffic manager of the network processor, a particular task of the one or more tasks as a received task corresponding to a data flow, the received task provided by one of the plurality of processing modules of the network processor;

generating, by the traffic manager, a scheduling hierarchy comprising a tree structure of a root scheduler and N scheduling levels, wherein a scheduler is a branch node and a corresponding queue is a leaf node of the scheduling hierarchy, where N is a positive integer;

determining, by the traffic manager, an associated queue of the scheduling hierarchy associated with the received task;

queuing, by the traffic manager, the received task in the associated queue, the associated queue having a corresponding parent scheduler at each of one or more next levels of the scheduling hierarchy up to the root scheduler, wherein the queue and the corresponding parent scheduler at each level of the scheduling hierarchy form a branch of the scheduling hierarchy;

selecting, by a parent scheduler, starting at the root scheduler and iteratively repeating at each of the corresponding N scheduling levels until a queue is selected, a child node to transmit at least one task from the traffic manager;

forming, by the traffic manager, one or more output packets for transmission from the network processor based on the at least one task from the selected queue, wherein the step of determining, by the traffic manager, a queue of the scheduling hierarchy associated with the received task further comprises:

determining a flow ID corresponding to the received task, wherein the flow ID corresponds to the queue of the scheduling hierarchy associated with the task;

comparing the determined flow ID to one or more configurable mapping tables of the traffic manager, wherein the one or more configurable mapping tables map a flow ID value to one or more queues of the scheduling hierarchy;

generating the one or more mapping tables at startup of the network processor with predetermined values from a control processor of the network processor, wherein the default values provide an initial structure of the scheduling hierarchy; and updating the one or more mapping tables during operation of the network processor based on one or more operating conditions of the network processor, wherein updating the one or more mapping tables dynamically restructures the scheduling hierarchy from the initial structure, wherein the one or more operating conditions of the network processor comprise at least one of: a number of tasks received by the traffic manager, a number of tasks enqueued by the traffic manager, a number of tasks transmitted by the traffic manager, one or more priorities of tasks of the network processor, and one or more types of data traffic of the network processor.

2. The method of claim 1 wherein the flow ID is a 24-bit value, the method further comprising:

mapping an upper 4 bits of the flow ID to an index of a level mapping table of the traffic manager, wherein the level mapping table defines a level of the scheduling hierarchy where the task will be enqueued;

adding, to a child data structure of the parent schedule, one or more indicators corresponding to the received task.

3. The method of claim 2, further comprising;

determining, based on the parent ID value and a lower 20 bits of the flow ID value, an address in the at least one shared memory corresponding to the location of the child data structure.

4. The method of claim 2, wherein the child data structure comprises traffic shaping data of each child node of the scheduler, wherein the traffic shaping data comprises a maximum peak data rate and a maximum sustained data rate of each child node.

5. The method of claim 2, wherein the child data structure comprises statistics data of each child node of the scheduler, and wherein the statistics data comprises a time value for a most recent task transmission from the child node and an amount data stored in the at least one shared memory.

6. The method of claim 2, further comprising:
updating, during operation of the network processor, (i) the level of the scheduling hierarchy where the tasks corresponding to a given flow ID are enqueued, and (ii) the parent ID value corresponding to the flow ID, whereby the queue corresponding to the flow ID is dynamically moved between the N levels of the scheduling hierarchy.

7. The method of claim 1, wherein
the root scheduler is configured to arbitrate between up to M child schedulers; and
each scheduler at a scheduling level below the root scheduler is configured to arbitrate between up to R child nodes,
wherein M and R are positive integers.

8. The method of claim 7, wherein M is 32 and R is 65536.

9. The method of claim 1, wherein N is 6.

10. The method of claim 1, wherein the scheduling hierarchy is one of symmetric and asymmetric.

11. A non-transitory machine-readable medium, having encoded thereon program code, wherein, when the program code is executed by a machine, the machine implements a method of dynamically constructing a scheduling hierarchy of a network processor having a plurality of processing modules and at least one shared memory with packet data, the method comprising:
generating, by the network processor, one or more tasks corresponding to each of a plurality of received packets associated with one or more data flows;
receiving, by a traffic manager of the network processor, a particular task of the one or more tasks as a received task corresponding to a data flow, the received task provided by one of the plurality of processing modules of the network processor;
generating, by the traffic manager, a scheduling hierarchy comprising a tree structure of a root scheduler and N scheduling levels, wherein a scheduler is a branch node and a corresponding queue is a leaf node of the scheduling hierarchy, where N is a positive integer;
determining, by the traffic manager, an associated queue of the scheduling hierarchy associated with the received task;
queuing, by the traffic manager, the received task in the associated queue, the associated queue having a corresponding parent scheduler at each of one or more next levels of the scheduling hierarchy up to the root scheduler, wherein the queue and the corresponding parent scheduler at each level of the scheduling hierarchy form a branch of the scheduling hierarchy;
selecting, by a parent scheduler, starting at the root scheduler and iteratively repeating at each of the corresponding N scheduling levels until a queue is selected, a child node to transmit at least one task from the traffic manager;
forming, by the traffic manager, one or more output packets for transmission from the network processor based on the at least one task from the selected queue,
wherein the step of determining, by the traffic manager, a queue of the scheduling hierarchy associated with the received task further comprises:
determining a flow ID corresponding to the received task, wherein the flow ID corresponds to the queue of the scheduling hierarchy associated with the task;
comparing the determined flow ID to one or more configurable mapping tables of the traffic manager, wherein the one or more configurable mapping tables map a flow ID value to one or more queues of the scheduling hierarchy;
generating the one or more mapping tables at startup of the network processor with predetermined values from a control processor of the network processor, wherein the default values provide an initial structure of the scheduling hierarchy; and
updating the one or more mapping tables during operation of the network processor based on one or more operating conditions of the network processor, wherein updating the one or more mapping tables dynamically restructures the scheduling hierarchy from the initial structure,
wherein the one or more operating conditions of the network processor comprise at least one of: a number of tasks received by the traffic manager, a number of tasks enqueued by the traffic manner, a number of tasks transmitted by the traffic manager, one or more priorities of tasks of the network processor, and one or more types of data traffic of the network processor.

12. The non-transitory machine-readable medium of claim 11 wherein the flow ID is a 24-bit value, the method further comprising:
mapping an upper 4 bits of the flow ID to an index of a level mapping table of the traffic manager, wherein the level mapping table defines a level of the scheduling hierarchy where the task will be coquetted;
adding, to a child data structure of the parent schedule, one or more indicators corresponding to the received task.

13. The non-transitory machine-readable medium of claim 12, further comprising:
updating, during operation of the network processor, (i) the level of the scheduling hierarchy where the tasks corresponding to a given flow ID are enqueued, and (ii) the parent ID value corresponding to the flow ID, whereby the queue corresponding to the flow ID is dynamically moved between the N levels of the scheduling hierarchy.

14. The non-transitory machine-readable medium of claim 11, wherein the scheduling hierarchy is one of symmetric and asymmetric.

15. A network processor comprising:
a. plurality of processing modules and at least one shared memory with packet data, wherein one of the plurality of processing modules is configured to generate one or more tasks corresponding to each of a plurality of received packets associated with one or more data flows;
a traffic manager of the network processor configured to:
receive a particular task of the one or more tasks as a received task corresponding to a data flow, the received task provided by one of the plurality of processing modules of the network processor;
generate a scheduling hierarchy comprising a tree structure of a root scheduler and N scheduling levels, wherein a scheduler is a branch node and a corresponding queue is a leaf node of the scheduling hierarchy, where N is a positive integer;
queue each received task in an associated queue of the scheduling hierarchy associated with the received task, the associated queue having a corresponding parent scheduler at each of one or more next levels of the scheduling hierarchy up to a root scheduler of the scheduling hierarchy, wherein the queue and one or more corresponding parent schedulers at each level of the scheduling hierarchy form a branch of the scheduling hierarchy;

select, by a parent scheduler, starting at the root scheduler and iteratively repeating at each of the corresponding N scheduling levels until a queue is selected, a child node to transmit at least one task from the traffic manager;

form one or more output packets for transmission from the network processor based on the at least one task from the selected queue, wherein the step of determining by the traffic manager, a queue of the scheduling hierarchy associated with the received task further comprises:

determining a flow ID corresponding to the received task, wherein the flow ID corresponds to the queue of the scheduling hierarchy associated with the task:

comparing the determined flow ID to one or more configurable mapping tables of the traffic manager, wherein the one or more configurable mapping tables map a flow ID value to one or more queues of the scheduling hierarchy;

generating the one or more mapping tables at startup of the network processor with predetermined values from a control processor of the network processor, wherein the default values provide an initial structure of the scheduling hierarchy: and updating the one or more mapping tables during operation of the network processor based on one or more operating conditions of the network processor, wherein updating the one or more mapping tables dynamically restructures the scheduling hierarchy from the initial structure, wherein the one or more operating conditions of the network processor comprise at least one of: a number of tasks received by the traffic manager, a number of tasks enqueued by the traffic manager, a number of tasks transmitted by the traffic manager, one or more priorities of tasks of the network processor, and one or more types of data traffic of the network processor.

16. The network processor of claim 15, wherein the network processor is implemented as an integrated circuit chip.

* * * * *